United States Patent
Han et al.

(10) Patent No.: US 12,493,389 B2
(45) Date of Patent: Dec. 9, 2025

(54) INPUT SENSOR AND ELECTRONIC DEVICE INCLUDING THE SAME

(71) Applicant: SAMSUNG DISPLAY CO., LTD., Yongin-si (KR)

(72) Inventors: Jeongyun Han, Yongin-si (KR); Gyeongnam Bang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/482,701

(22) Filed: Oct. 6, 2023

(65) Prior Publication Data

US 2024/0118779 A1 Apr. 11, 2024

(30) Foreign Application Priority Data

Oct. 7, 2022 (KR) .................. 10-2022-0128994
Jan. 18, 2023 (KR) .................. 10-2023-0007214

(51) Int. Cl.
*G06F 3/044* (2006.01)
*G06F 3/041* (2006.01)
*H10K 59/131* (2023.01)
*H10K 59/40* (2023.01)

(52) U.S. Cl.
CPC ........ *G06F 3/0446* (2019.05); *G06F 3/04164* (2019.05); *H10K 59/131* (2023.02); *H10K 59/40* (2023.02)

(58) Field of Classification Search
CPC .. G06F 3/0446; G06F 3/04164; G06F 3/0443; G06F 3/0448; H10K 59/131; H10K 59/40
See application file for complete search history.

(56) References Cited

U.S. PATENT DOCUMENTS

| | | | |
|---|---|---|---|
| 9,851,855 B2 * | 12/2017 | Bok | G06F 3/0443 |
| 11,334,207 B2 | 5/2022 | Kim et al. | |
| 11,385,751 B2 | 7/2022 | Bang et al. | |
| 11,500,501 B2 | 11/2022 | Lee et al. | |
| 11,507,233 B2 | 11/2022 | Gwon et al. | |

(Continued)

FOREIGN PATENT DOCUMENTS

| | | |
|---|---|---|
| KR | 10-2017-0051713 | 5/2017 |
| KR | 10-2022-0005246 | 1/2022 |

(Continued)

*Primary Examiner* — Md Saiful A Siddiqui
(74) *Attorney, Agent, or Firm* — F. CHAU & ASSOCIATES, LLC

(57) ABSTRACT

An input sensor includes a plurality of first sensor electrodes extending along a first direction in an active area, a plurality of second sensor electrodes extending along a second direction. A sensor driver is spaced apart from the active area in the second direction. A plurality of first sensor lines connects the first sensor electrodes to the sensor driver and overlap the active area. A plurality of second sensor lines connect the second sensor electrodes to the sensor driver. The first sensor electrodes include first to n-th row sensor electrodes sequentially arranged in a direction adjacent to the sensor driver. The number of first sensor lines electrically connected to the first row sensor electrode is larger than the number of first sensor lines electrically connected to the n-th row sensor electrode.

23 Claims, 19 Drawing Sheets

(56) References Cited

U.S. PATENT DOCUMENTS

| | | | | |
|---|---|---|---|---|
| 2012/0182233 | A1* | 7/2012 | Kim | G06F 3/0446 |
| | | | | 345/173 |
| 2015/0277635 | A1* | 10/2015 | Kim | G06F 3/047 |
| | | | | 345/173 |
| 2016/0109997 | A1* | 4/2016 | Yu | G06F 3/0445 |
| | | | | 345/173 |
| 2016/0195984 | A1* | 7/2016 | Bok | G06F 3/0446 |
| | | | | 345/173 |
| 2016/0253001 | A1* | 9/2016 | Sugita | G02F 1/13338 |
| | | | | 345/174 |
| 2017/0090625 | A1* | 3/2017 | Makino | G06F 3/0443 |
| 2017/0255296 | A1* | 9/2017 | Takiguchi | G06F 3/0445 |
| 2018/0032193 | A1* | 2/2018 | Qu | G02F 1/13338 |
| 2018/0039358 | A1* | 2/2018 | Xie | G06F 3/0448 |
| 2019/0265820 | A1* | 8/2019 | Li | H01L 24/42 |
| 2020/0013844 | A1* | 1/2020 | Cho | H10K 59/123 |
| 2021/0141490 | A1* | 5/2021 | Bang | G06F 3/0412 |
| 2021/0271367 | A1 | 9/2021 | Park et al. | |
| 2022/0004282 | A1* | 1/2022 | Lee | G06F 3/0448 |
| 2023/0354669 | A1* | 11/2023 | Zhang | G06F 3/0443 |
| 2024/0310950 | A1* | 9/2024 | Mo | G06F 3/04164 |

FOREIGN PATENT DOCUMENTS

| | | |
|---|---|---|
| KR | 10-2022-0016360 | 2/2022 |
| KR | 10-2022-0084638 | 6/2022 |

* cited by examiner

INPUT SENSOR AND ELECTRONIC DEVICE INCLUDING THE SAME

CROSS-REFERENCE TO RELATED APPLICATIONS

This U.S. non-provisional patent application claims priority under 35 U.S.C. § 119 to Korean Patent Application No. 10-2022-0128994, filed on Oct. 7, 2022 and to Korean Patent Application No. 10-2023-0007214, filed on Jan. 18, 2023, the contents of which are hereby incorporated by reference in their entirety.

TECHNICAL FIELD

The present disclosure relates to an input sensor and, more specifically, to an input sensor including sensor lines and sensor electrodes an electronic device including the same.

DISCUSSION OF THE RELATED ART

Multimedia electronic devices, such as televisions, mobile phones, tablet computers, navigation devices, and game consoles, include a display device to display images. Display devices are also commonly provided inside of vehicles.

Many display devices include an input sensor that provides a touch-based input method allowing users to easily and intuitively input information or commands by touching the display device, in addition to the usual input methods, such as a buttons, keyboards, mice, etc.

SUMMARY

An input sensor includes a plurality of first sensor electrodes extending in a first direction within an active area of the input sensor. A plurality of second sensor electrodes are arranged along the first direction within the active area and extending in a second direction crossing the first direction. A sensor driver is disposed in a peripheral area of the input sensor, adjacent to the active area and spaced apart from the active area in the second direction. A plurality of first sensor lines electrically connect the first sensor electrodes to the sensor driver and overlap the active area. A plurality of second sensor lines electrically connect the second sensor electrodes to the sensor driver. The first sensor electrodes include first to n-th row sensor electrodes. The number of first sensor lines electrically connected to the first row sensor electrode is larger than the number of first sensor lines electrically connected to the n-th row sensor electrode.

Each of the first sensor electrodes includes a plurality of first sensor patterns arranged in the first direction and a plurality of first connection patterns each disposed between the first sensor patterns and electrically connecting adjacent pairs of the first sensor patterns. Each of the second sensor electrodes includes a plurality of second sensor patterns arranged in the second direction and a plurality of second connection patterns each disposed between adjacent pairs of the second sensor patterns to electrically connect the adjacent pairs of the second sensor patterns to each other. The first connection patterns are disposed on a layer that is different from a layer of the second connection patterns.

The first sensor lines are disposed on a layer that is different from the first sensor patterns within the active area.

The first sensor lines are disposed on the same layer as the first connection patterns and/or the second connection patterns.

The first sensor lines are spaced apart from the first connection patterns and the second connection patterns, in a plan view.

The first sensor lines electrically connected to the first row sensor electrode are electrically connected to one first sensor pattern.

The first sensor lines electrically connected to the first row sensor electrode are respectively electrically connected to different first sensor patterns.

The first sensor lines electrically connected to the first row sensor electrode overlap at least one of the second sensor lines in the peripheral area.

Each of the first sensor lines consists of a singular integral structure.

Each of the first sensor lines includes a vertical portion extending in the second direction and a horizontal portion extending in the first direction and electrically connected to the vertical portion, the vertical portion overlaps at least a portion of the first sensor electrodes, and the horizontal portion is spaced apart from the first sensor electrodes, in a plan view.

A width in the first direction of the vertical portion is smaller than a width in the first direction of each of the second sensor lines.

The width in the first direction of the vertical portion is smaller than a width in the second direction of the horizontal portion.

The vertical portion and the horizontal portion are disposed on different layers from each other.

An electronic device includes a base layer including an active area and a peripheral area adjacent to the active area. A plurality of first sensor electrodes including a plurality of first sensor patterns are disposed within the active area and are arranged in a first direction. A plurality of first connection patterns, each being disposed between the first sensor patterns, electrically connect adjacent pairs of the first sensor patterns. A plurality of second sensor electrodes including a plurality of second sensor patterns is disposed within the active area and are arranged in a second direction crossing the first direction. A plurality of second connection patterns are disposed between adjacent pairs of the second sensor patterns to electrically connect the adjacent pairs of the second sensor patterns. The second connection patterns are eclectically insulated from the first connection patterns. A circuit board is electrically connected to the base layer and includes a sensor driver spaced apart from the first sensor electrodes in the second direction, a plurality of first sensor lines electrically connecting the sensor driver and the first sensor electrodes, and a plurality of second sensor lines electrically connecting the sensor driver and the second sensor electrodes. Each of the first sensor lines includes a contact portion that is in contact with a corresponding first sensor electrode among the first sensor electrodes, and the number of contact portions provided in a first row sensor electrode disposed farthest from the sensor driver among the first sensor electrodes is larger than the number of contact portions provided in an n-th row sensor electrode of the first sensor electrodes disposed closest to the sensor driver among the first sensor electrodes.

The number of the contact portions provided in the first row sensor electrode is equal to or greater than two, and the number of the contact portions provided in the n-th row sensor electrode is equal to or greater than one.

The contact portions provided in the first row sensor electrode are provided to one first sensor part.

The contact portions provided in the first row sensor electrode are provided to different first sensor patterns from each other.

The contact portions electrically connected to each of the first to n-th row sensor electrodes are sequentially arranged in the first direction.

The contact portion provided in the n-th row sensor electrode is disposed between the contact portions provided in the first row sensor electrode, when viewed in the first direction.

The contact portion that is in contact with the first sensor lines electrically connected to the first row sensor electrode is provided on the base layer.

The contact portion that is in contact with the first sensor lines electrically connected to the first row sensor electrode is provided on the circuit board.

The electronic device further includes an organic light emitting element disposed between the base layer and the first sensor electrodes and disposed within the active area. A power pattern electrically connected to the organic light emitting element is disposed within the peripheral area. An insulating layer is disposed between the power pattern and the first sensor lines. At least a portion of the first sensor line and the second sensor line overlap the power pattern, in a plan view.

The insulating layer is provided in plural, and each of the first lines includes a plurality of portions disposed on different layers from each other, above the power pattern and electrically connected to each other via at least one of the insulating layers.

BRIEF DESCRIPTION OF THE DRAWINGS

The above and other aspects of the present disclosure will become readily apparent by reference to the following detailed description when considered in conjunction with the accompanying drawings, wherein.

DETAILED DESCRIPTION

In the present disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals may refer to like elements throughout the specification and the drawings.

As used herein, the term "and/or" may include any and all combinations of one or more of the associated listed items.

It will be understood that, although the terms first, second, etc. may be used herein to describe various elements, these elements should not necessarily be limited by these terms. These terms are used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present disclosure will be described with reference to accompanying drawings.

Figure 1A:
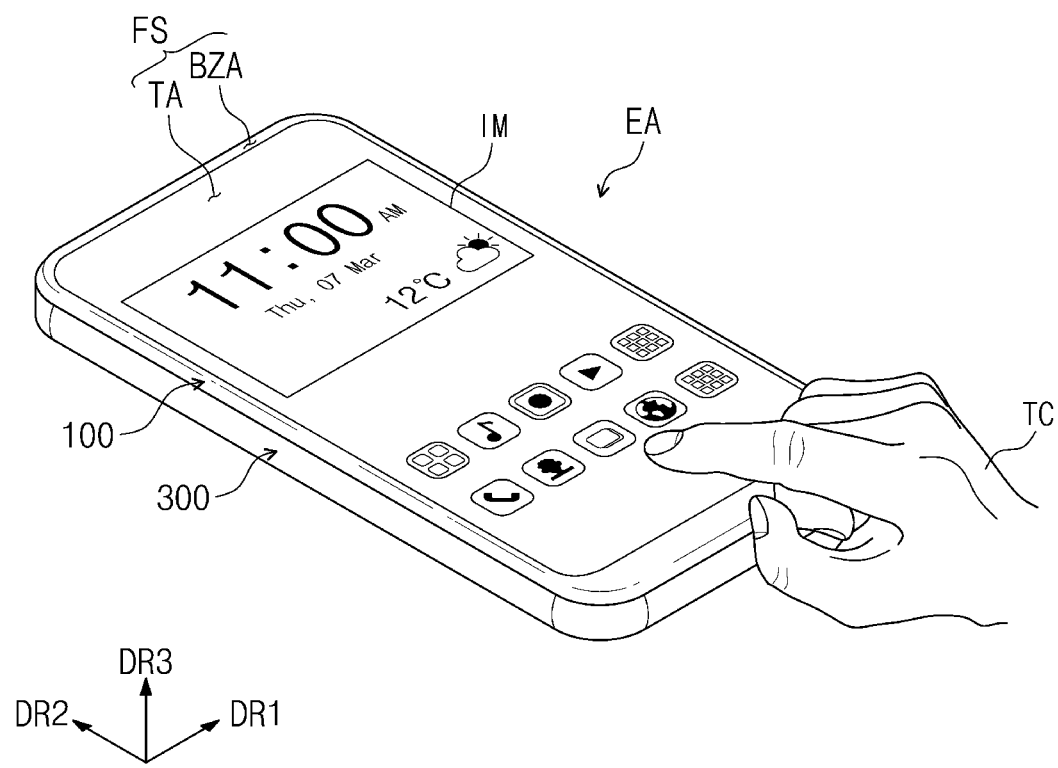
FIG. 1A is a perspective view of an electronic device according to an embodiment of the present disclosure.
Figure 1B:
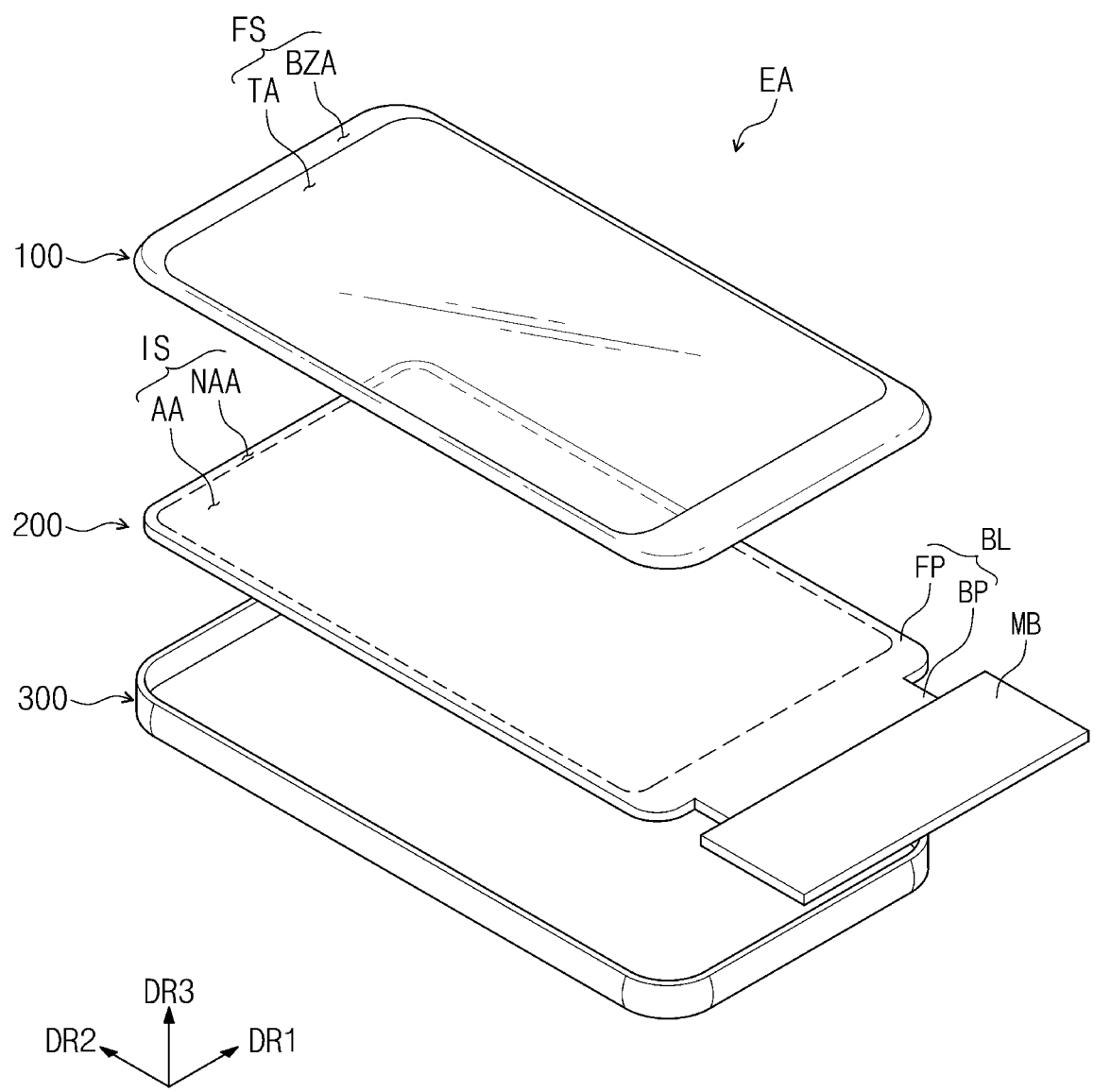
FIGS. 1B and 1C are exploded perspective views of an electronic device according to an embodiment of the present disclosure.
Figure 1C:
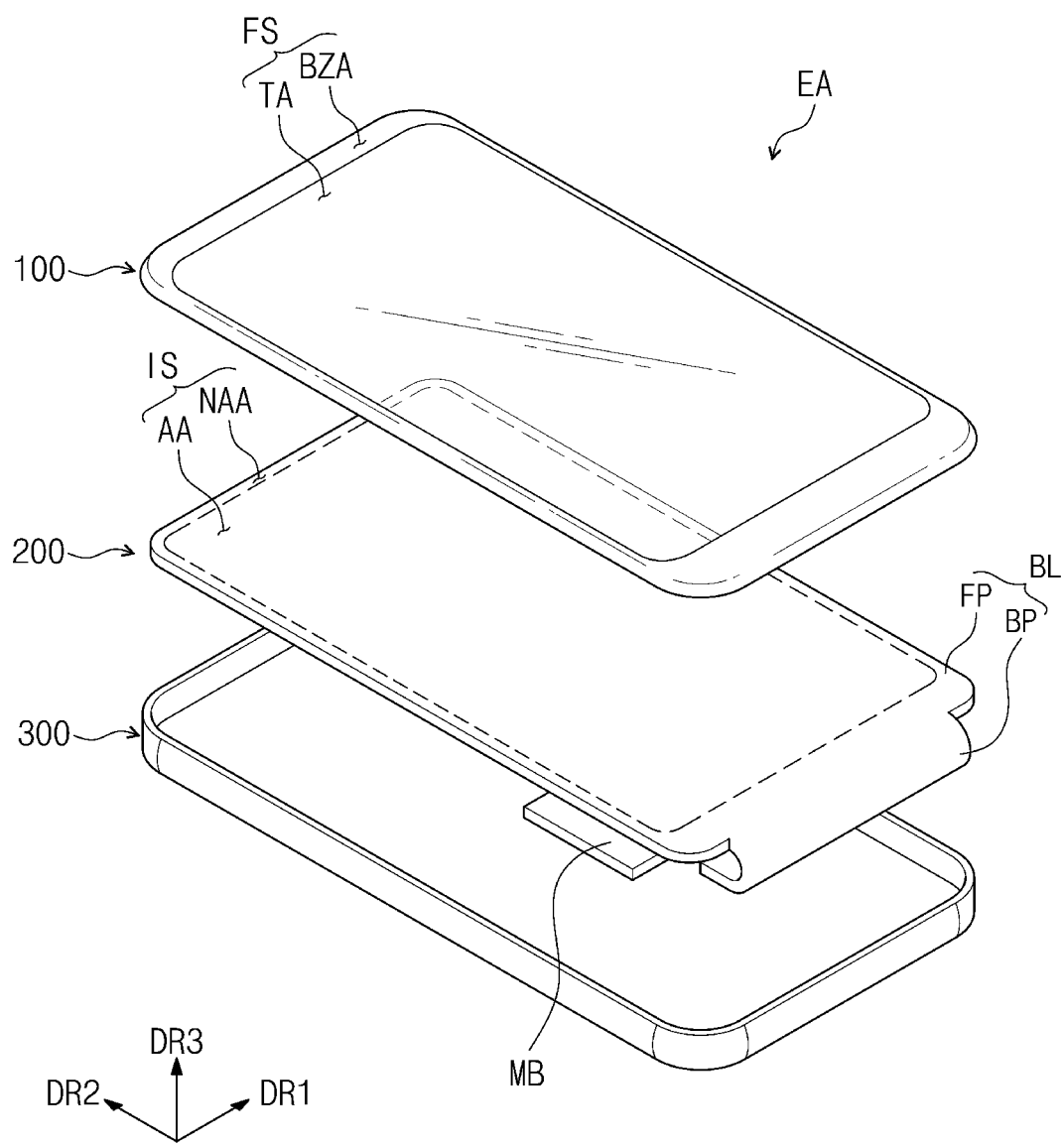

FIG. 1A is a perspective view of an electronic device EA according to an embodiment of the present disclosure. FIGS. 1B and 1C are exploded perspective views of the electronic device EA according to an embodiment of the present disclosure. FIG. 1B is a perspective view illustrating a state in which some components are unfolded, and FIG. 1C is a perspective view illustrating a state in which the some components are folded. Hereinafter, the present disclosure will be described with reference to FIGS. 1A to 1C.

The electronic device EA may be a device that is activated in response to an electrical signal. The electronic device EA may display an image IM and may sense an external input TC. The electronic device EA may include various embodiments. For example, the electronic device EA may include a tablet computer, a notebook computer, a computer monitor, a smart television set, etc. In the present embodiment, a smartphone will be described as a representative example of the electronic device EA.

The electronic device EA may display the image IM through a display surface FS, which is substantially parallel to each of a first direction DR1 and a second direction DR2, and facing toward a third direction DR3. The image IM may include a video and a still image. FIG. 1A shows a clock widget and application icons as a representative example of the image IM. The display surface FS through which the image IM is displayed may correspond to a front surface of the electronic device EA and a front surface FS of a window 100. Hereinafter, the display surface and the front surface of the electronic device EA and the front surface FS of the window 100 will be assigned with the same reference numeral.

In the present embodiment, front (or upper) and rear (or lower) surfaces of each member of the electronic device EA may be defined with respect to a direction in which the image IM is displayed. The front and rear surfaces may be opposite to each other in the third direction DR3, and a normal line direction of each of the front and rear surfaces may be substantially parallel to the third direction DR3. A separation distance between the front surface and the rear surface in the third direction DR3 may correspond to a thickness in the third direction DR3 of the electronic device EA. Directions indicated by the first, second, and third directions DR1, DR2, and DR3 may be relative to each other, and thus, the directions indicated by the first, second, and third directions DR1, DR2, and DR3 may be changed to other directions.

The electronic device EA may sense an external input, or a user input, TC applied thereto. The user input TC may include various forms of external inputs provided from the outside of the electronic device EA, such as a part of the user's body, light, heat, or pressure. In the present embodiment, the user input TC is shown as the user's hand touching the front surface. However, this is merely one example, and the user input TC may be provided in various ways. In addition, the electronic device EA may sense the user input TC applied to a side surface or a rear surface thereof according to a structure of the electronic device EA, and it should not necessarily be particularly limited thereto.

Referring to FIGS. 1B and 1C, the electronic device EA may include the window 100, an electronic panel 200, and an external case 300. In the present embodiment, the external case 300, the electronic panel 200, and the window 100 may be sequentially stacked in the third direction DR3. The window 100 and the external case 300 may be coupled to each other to provide an exterior of the electronic device EA.

The window 100 may be disposed on the electronic panel 200 and may cover a front surface IS of the electronic panel 200. The window 100 may include an insulating panel. For example, the window 100 may include a glass material, a plastic material, a crystal, or a combination thereof.

The front surface FS of the window 100 may define the front surface of the electronic device EA, as described above. The front surface FS may include a transmissive area TA and a bezel area BZA. The transmissive area TA may be an optically transparent area. For example, the transmissive area TA may be an area having a transmittance of visible light of about 90% or more.

The bezel area BZA may be an area with a lower transmittance than that of the transmissive area TA. The bezel area BZA may define a shape of the transmissive area TA. The bezel area BZA may be disposed adjacent to the transmissive area TA and may at least partially surround the transmissive area TA.

The bezel area BZA may have a predetermined color. The bezel area BZA may cover a peripheral area NAA of the electronic panel 200 to prevent the peripheral area NAA from being seen by a user. However, this is merely an example, and the bezel area BZA may be omitted from the window, 100 according to an embodiment of the present disclosure.

The electronic panel 200 may display the image IM and may sense the external input TC. The image IM may be displayed through the front surface IS of the electronic panel 200. The front surface IS of the electronic panel 200 may include an active area AA and the peripheral area NAA. The active area AA may be an area activated in response to an electrical signal.

In the present embodiment, the active area AA may be an area through which the image IM is displayed and the external input TC is sensed. The transmissive area TA may at least partially overlap the active area AA. For example, the transmissive area TA may overlap an entire surface or at least a portion of the active area AA. Accordingly, the user may view the image IM or may provide the external input TC through the transmissive area TA, however, this is merely an example. According to an embodiment, the active area AA of the electronic panel 200 may be divided into an area through which the image IM is displayed and an area in which the external input TC is sensed, however, it should not necessarily be limited thereto or thereby.

The peripheral area NAA may be covered by the bezel area BZA. The peripheral area NAA may be disposed adjacent to the active area AA. The peripheral area NAA may at least partially surround the active area AA. A driving circuit or a driving line to drive the active area AA may be disposed in the peripheral area NAA.

The electronic panel 200 may include a display part and a sensor part. The image IM may be displayed in the display part, and the external input TC may be sensed in the sensor part. As the electronic panel 200 includes both the display part and the sensor part, the electronic panel 200 may display the image IM while sensing the external input TC.

At least a portion of the electronic panel 200 may be bent to a noticeable extent without cracking or otherwise causing damage thereto. The electronic panel 200 may include a base layer BL, and the base layer BL may include a flat portion FP and a bending portion BP. Pixels displaying the image IM and sensors sensing the external input TC may be arranged in the base layer BL. The electronic panel 200 may have a shape corresponding to a shape of the base layer BL, in a plan view. The flat portion FP and the bending portion BP may be connected to each other and may be provided integrally with each other. The active area AA may be disposed in the flat portion FP. A circuit board MB may be spaced apart from the flat portion FP and may be coupled to the bending portion BP.

The bending portion BP may be bent from the flat portion FP. The bending portion BP and the flat portion FP may provide the same plane as shown in FIG. 1B or may provide different planes as shown in FIG. 1C on the plane defined by the first direction DR1 and the second direction DR2. As the bending portion BP is bent, the circuit board MB may be disposed under the rear surface of the electronic panel 200. In the present embodiment, the bending portion BP of the electronic panel 200, which is connected to the circuit board MB, is bent toward the rear surface of the electronic panel 200, and thus, the circuit board MB may be assembled with the electronic panel 200 while overlapping the electronic panel 200, in a plan view. Accordingly, the circuit board MB may be accommodated in an accommodation space provided by the external case 300, and a size of the bezel area BZA may be reduced. As a result, the electronic device EA with a narrow-bezel design may be provided.

The electronic device EA may further include the circuit board MB connected to the electronic panel 200. The circuit board MB may be coupled to one side of the electronic panel 200 and may be physically and electrically connected to the electronic panel 200. The circuit board MB may generate the electrical signal provided to the electronic panel 200 or may receive signals generated by the electronic panel 200 to calculate a resulting value including information about a position at which the external input TC is sensed or intensity of the external input TC.

The external case 300 may be coupled with the window 100 to define an exterior of the electronic device EA. The external case 300 may provide a predetermined inner space. The electronic panel 200 may be accommodated in the inner space.

The external case 300 may include a material with a relatively high rigidity. For example, the external case 300 may include a glass, plastic, carbon, or metal material or a plurality of frames and/or plates of combinations thereof. The external case 300 may stably protect the components of the electronic device EA accommodated in the inner space from external impacts.

Figure 2A:
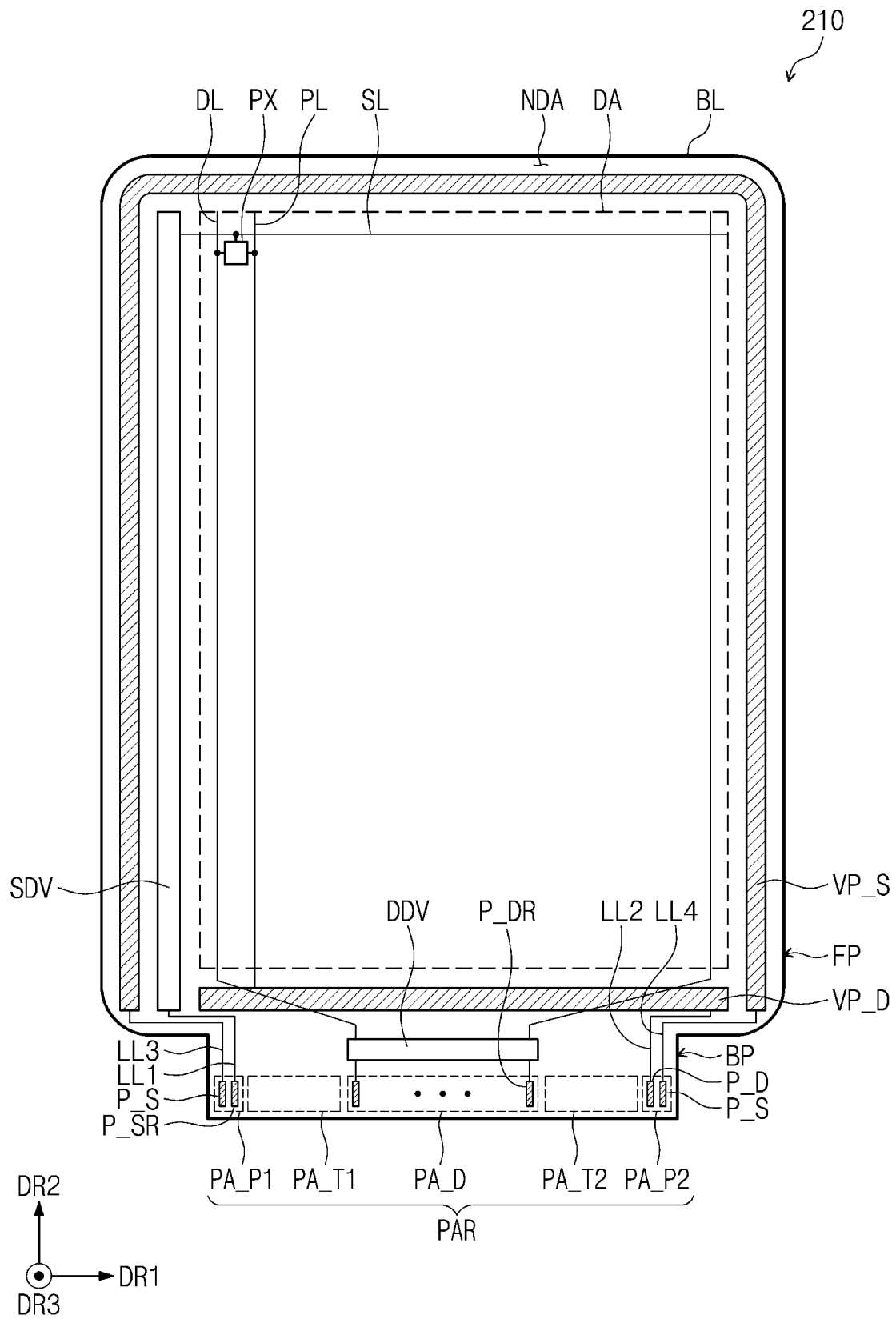
FIG. 2A is a plan view of a display part according to an embodiment of the present disclosure.
Figure 2B:
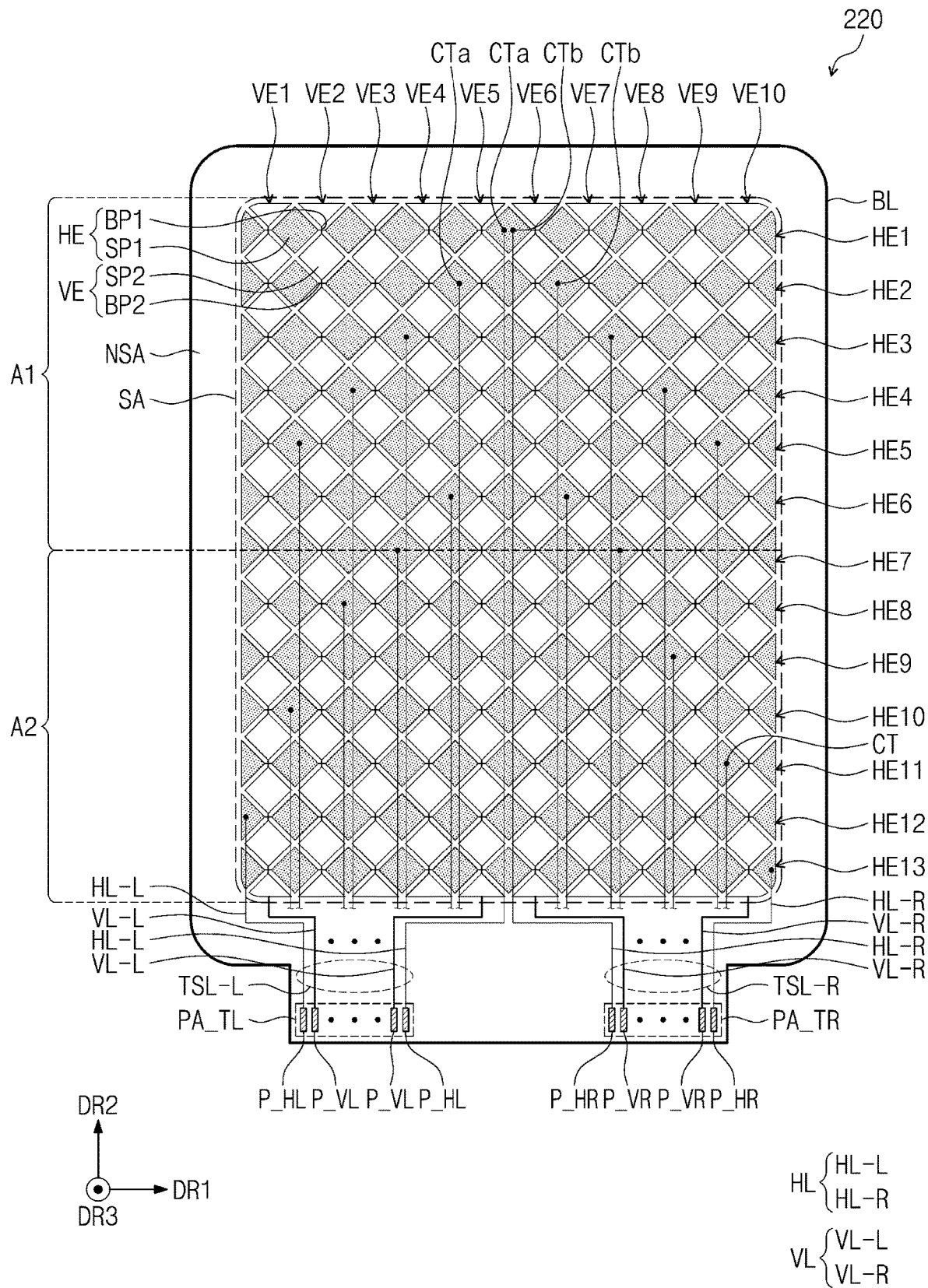
FIG. 2B is a plan view of a sensor part according to an embodiment of the present disclosure.

FIG. 2A is a plan view of the display part according to an embodiment of the present disclosure. FIG. 2B is a plan view of the sensor part according to an embodiment of the present disclosure. It is to be understood that there may be additional elements, besides the elements shown. Hereinafter, the present disclosure will be described with reference to FIGS. 2A and 2B.

Referring to FIG. 2A, the display part 210 may include the base layer BL, a plurality of pixels PX, a scan driver SDV, a data driver DDV, a first power pattern VP_D, a second power pattern VP_S, and a plurality of signal lines SL, DL, PL, LL1, LL2, LL3, and LL4.

The base layer BL may include the flat portion FP and the bending portion BP. The bending portion BP may be bent about a bending axis that extends in the first direction DR1. The bending portion BP may have a width that is smaller than a width of the flat portion FP in the first direction DR1. For example, a length in the first direction DR1 of the bending portion BP may be narrower than a length in the first direction DR1 of the flat portion FP. The first direction DR1 may correspond to a bending axis direction of the bending portion BP, and a portion of the electronic panel 200 may be more easily bent when a length in the bending axis direction becomes shorter, however, this is merely an example. According to an embodiment, the flat portion FP and the bending portion BP may have substantially the same width as each other in the first direction DR1, and the present disclosure should not necessarily be particularly limited thereto.

The display part 210 may include a display area DA and a peripheral area NDA. The display area DA may be disposed in the flat portion FP, and the peripheral area NDA may be disposed in the bending portion BP and a remaining portion of the flat portion FP except the display area DA. The peripheral area NDA may include a pad area PAR disposed in the bending portion BP.

The display area DA may be an area in which the pixels PX are arranged. The display area DA may be an area in which the image IM is displayed. Accordingly, the display area DA may be an area in which display elements of the pixels PX are arranged. In the present embodiment, for the convenience of explanation, a pixel PX having a quadrilateral shape and disposed in the display area DA is shown as a representative example, however, this is merely an example. According to an embodiment, a display element, e.g., a light emitting element, among elements of the pixel PX may be disposed in the display area DA, and a driving element, e.g., a transistor, to drive the display element may be disposed in the peripheral area NDA, however, the present disclosure should not necessarily be particularly limited thereto.

The scan driver SDV, the data driver DDV, the first power pattern VP_D, and the second power pattern VP_S may be disposed in the peripheral area NDA. The scan driver SDV, the data driver DDV, the first power pattern VP_D, and the second power pattern VP_S may be electrically connected to the pixel PX via the signal lines SL, DL, PL, LL1, LL2, LL3, and LL4 or may be electrically connected to the circuit board MB via the pad area PAR.

The signal lines SL, DL, PL, LL1, LL2, LL3, and LL4 may include a plurality of scan lines SL, a plurality of data lines DL, a plurality of power lines PL, and a plurality of control lines LL1, LL2, LL3, and LL4. In the present embodiment, for the convenience of explanation, signal lines electrically connected to one pixel PX among the scan lines SL, the data lines DL, and the power lines PL are shown as a representative example.

The scan driver SDV may be disposed in the peripheral area NDA. In the present embodiment, the scan driver SDV is disposed between the display area DA and the second power pattern VP_S, however, the present disclosure should not necessarily be limited thereto or thereby. According to an embodiment, the scan driver SDV may overlap the display area DA. The scan driver SDV may be electrically connected to a scan control pad P_SR via a first control line LL1 and may receive a scan control signal from the outside. The scan control signal may include a vertical start signal or a clock signal.

The scan lines SL may be arranged in the second direction DR2, may extend in a direction parallel to the first direction DR1, and may be electrically connected to the scan driver SDV and the pixels PX. One scan line may connect the scan driver SDV to the pixels arranged in one row. The pixel PX may receive a scan signal from the scan driver SDV via the scan line.

The data driver DDV may be disposed in the peripheral area NDA. In the present embodiment, the data driver DDV is disposed between the display area DA and the pad area PAR, however, it should not necessarily be limited thereto or thereby. In the present embodiment, the data driver DDV is mounted on the base layer BL in a chip form, however, it should not necessarily be limited thereto or thereby. According to an embodiment, the data driver DDV may be mounted on the circuit board MB (refer to FIG. 1B) instead of the display part 210. The data driver DDV may be electrically connected to data signal pads P_DR and may receive a data control signal from the outside. The data control signal may include a horizontal start signal, a data clock signal, an image data signal, and the like.

The data lines DL may be arranged in the first direction DR1, may extend in a direction parallel to the second direction DR2, and may be electrically connected to the data driver DDV and the pixels PX. One data line may connect the data driver DDV to pixels arranged in one column. The pixel PX may receive a data signal from the data driver DDV via the data line. The data signal may include information about a luminance of light or a grayscale displayed through the pixel PX.

The power lines PL may be substantially parallel to the data lines DL. For example, the power lines PL may be arranged in the first direction DR1, may extend in the direction parallel to the second direction DR2, and may be electrically connected to the first power pattern VP_D and the pixels PX. One power line may connect the first power pattern VP_D to the pixels arranged in one column. The pixels PX may receive data power signal from the circuit board via the power lines PL.

The first power pattern VP_D may be disposed in the peripheral area NDA. In the present embodiment, the first power pattern VP_D is disposed between the display area DA and the pad area PAR, however, it should not necessarily be limited thereto or thereby. The first power pattern VP_D may be electrically connected to a first power pad P_D via a second control line LL2 and may receive a first power supply voltage from the outside. The first power supply voltage may be a constant voltage.

The second power pattern VP_S may be disposed in the peripheral area NDA. In the present embodiment, the second power pattern VP_S is disposed in the flat portion FP and may have a shape extending along three sides of the display area DA, however, it should not necessarily be limited thereto or thereby. The second power pattern VP_S may be electrically connected to second power pads P_S via a third control line LL3 and a fourth control line LL4 and may receive a second power supply voltage from the outside. The second power supply voltage may be a constant voltage.

The pad area PAR may be disposed in the bending portion BP. The circuit board MB (refer to FIG. 1B) may be electrically connected to the electronic panel 200 (refer to FIG. 1B) via the pad area PAR. The pad area PAR may include a first control pad area PA_P1, a first sensor pad area PA_T1, a display pad area PA_D, a second sensor pad area PA_T2, and a second control pad area PA_P2, which are sequentially arranged in the first direction DR1. An arrangement of the areas for the pad area PAR may be changed in various ways as long as they are electrically connected to the circuit board MB.

The first control pad area PA_P1 may be an area in which a pad among the second power pads P_S, which is electrically connected to the third control line LL3, and the scan control pad P_SR are arranged. The display pad area PA_D may be an area in which the data signal pads P_DR are arranged. The first control pad area PA_P1 may be an area in which the first power pad P_D and a pad among the second power pads P_S, which is electrically connected to the fourth control line LL4, are arranged.

The first sensor pad area PA_T1 and the second sensor pad area PA_T2 may be areas in which pads electrically connected to the sensor part 220 (refer to FIG. 2B) are arranged. The first sensor pad area PA_T1 may be disposed between the first control pad area PA_P1 and the display pad area PA_D, and the second sensor pad area PA_T2 may be disposed between the second control pad area PA_P2 and the display pad area PA_D. According to the present disclosure, as the first sensor pad area PA_T1 and the second sensor pad area PA_T2 are arranged so as not to overlap the pad areas PA_D, PA_P1, and PA_P2 electrically connected to the display part 210, electrical interferences between the pads electrically connected to the display part 210 and the pads electrically connected to the sensor part 220 may be reduced. In addition, as the pads electrically connected to the display part 210 and the pads electrically connected to the sensor part 220 are arranged in one pad area PAR, the display part 210 and the sensor part 220 may be easily controlled using one circuit board MB. According to an embodiment, the first sensor pad area PA_T1 and the second sensor pad area PA_T2 may be disposed at other positions, and they should not necessarily be particularly limited to the arrangement shown.

Referring to FIG. 2B, the sensor part 220 may include a sensing area SA and a peripheral area NSA. The sensing area SA may be disposed in the flat portion FP, and the peripheral area NSA may be disposed in the bending portion BP and a remaining portion of the flat portion FP except the sensing area SA.

The sensing area SA may be an area in which the external input is sensed. For example, the sensing area SA may be an area in which a plurality of sensor electrodes HE1 to HE13 and VE1 to VE10 is arranged. The sensor electrodes HE1 to HE13 and VE1 to VE10 may include a plurality of first sensor electrodes HE1 to HE13 and a plurality of second sensor electrodes VE1 to VE10.

The first sensor electrodes HE1 to HE13 may be arranged in the direction parallel to the second direction DR2 and may extend in the first direction DR1. One first sensor electrode HE may include a plurality of first sensor patterns SP1 and a plurality of first connection patterns BP1.

The first sensor patterns SP1 may be arranged in the first direction DR1. The first connection patterns BP1 may be arranged in the first direction DR1, and each of the first connection patterns BP1 may be disposed between the first sensor patterns SP1 to connect first sensor patterns adjacent to each other.

The second sensor electrodes VE1 to VE10 may be arranged in the first direction DR1 and may extend in the second direction DR2. One second sensor electrode VE may include a plurality of second sensor patterns SP2 and a plurality of second connection patterns BP2.

The second sensor patterns SP2 may be arranged in the direction parallel to the second direction DR2. The second connection patterns BP2 may be arranged in the direction parallel to the second direction DR2, and each of the second connection patterns BP2 may be disposed between the second sensor patterns SP2 to connect second sensor patterns adjacent to each other.

The first connection patterns BP1 may be insulated from the second connection patterns BP2. In the present embodiment, the first connection patterns BP1 may be disposed at a position overlapping the second connection patterns BP2 and may be insulated from the second connection patterns BP2 while crossing the second connection patterns BP2, however, this is merely an example. According to an embodiment, the first connection patterns BP1 and the second connection patterns BP2 may be disposed not to overlap each other in a plan view and should not necessarily be particularly limited thereto.

The first sensor patterns SP1 may be insulated from the second sensor patterns SP2. In the present embodiment, the first sensor patterns SP1 might not overlap the second sensor patterns SP2 in a plan view, however, this is merely an example. According to an embodiment, the first sensor patterns SP1 and the second sensor patterns SP2 may overlap each other in a plan view and may be insulated from each other while crossing each other.

The first sensor electrodes HE1 to HE13 and the second sensor electrodes VE1 to VE10 may be electrically connected to sensor pads P_HL, P_HR, P_VL, and P_VR arranged in sensor pad areas PA_TL and PA_TR via a plurality of sensor lines TSL-L and TSL-R. Pads electrically connected to first group sensor lines TSL-L may be arranged in a first sensor pad area PA_TL, and pads electrically connected to second group sensor lines TSL-R may be arranged in a second sensor pad area PA_TR. The first group sensor lines TSL-L may be disposed at a left side relative to a center of the sensor part 220 and may include, for example, left first sensor lines HL-L and left second sensor lines VL-L. The second group sensor lines TSL-R may be disposed at a right side relative to the center of the sensor part 220 and may include, for example, right first sensor lines HL-R and right second sensor lines VL-R. This is merely an example, and the arrangement of the sensor lines TSL-L and TSL-R may be changed in various ways depending on the arrangement of the first sensor pad area PA_TL and the second sensor pad area PA_TR, and the present disclosure should not necessarily be particularly limited thereto.

In the present embodiment, the first sensor electrodes HE1 to HE13 may include thirteen first sensor electrodes HE1 to HE13 (hereinafter, referred to as first to thirteenth row sensor electrodes) sequentially arranged in a direction opposite to the second direction DR2, i.e., a direction approaching the sensor pad areas PA_TL and PA_TR, however, the number of the first sensor electrodes HE1 to HE13 should not necessarily be limited thereto or thereby. In addition, the second sensor electrodes VE1 to VE10 may include ten second sensor electrodes VE1 to VE10 (hereinafter, referred to as first to tenth column sensor electrodes) sequentially arranged in the first direction DR1, however, the number of the second sensor electrodes VE1 to VE10 should not necessarily be limited thereto or thereby.

The first to tenth column sensor electrodes VE1 to VE10 may be electrically connected to corresponding pads P_VL and P_VR via the second sensor lines VL-L and VL-R, respectively. Among the first to tenth column sensor electrodes VE1 to VE10, the first to fifth column sensor electrodes VE1 to VE5 disposed at a left side may be respectively electrically connected to left second sensor pads P_VL via the left second sensor lines VL-L. Among the first to tenth column sensor electrodes VE1 to VE10, the sixth to tenth column sensor electrodes VE6 to VE10 disposed at a right side may be respectively electrically connected to right second sensor pads P_VR via the right second sensor lines VL-R.

The left second sensor lines VL-L may be respectively electrically connected to ends of the first to fifth column sensor electrodes VE1 to VE5, and the right second sensor lines VL-R may be respectively electrically connected to ends of the sixth to tenth column sensor electrodes VE6 to VE10. Accordingly, the left second sensor lines VL-L and the right second sensor lines VL-R may be disposed in the peripheral area NSA or may partially overlap the second sensor patterns SP2 closest to the peripheral area NSA. Contact portions between the sensor lines VL-L and VL-R and the sensor electrodes VE1 to VE10 may be disposed in the second sensor patterns SP2 closest to the peripheral area NSA.

The first to thirteenth row sensor electrodes HE1 to HE13 may be respectively electrically connected to corresponding pads P_HL and P_HR via the first sensor lines HL-L and HL-R. The sensing area SA may include a first area A1 disposed at an upper side in the second direction DR2 and disposed relatively far away from the pad areas PA_TL and PA_TR and a second area A2 disposed at a lower side in the second direction DR2 and disposed relatively close to the pad areas PA_TL and PA_TR. In the present embodiment, the first area A1 may include the first to sixth row sensor electrodes HE1 to HE6, and the second area A2 may include the eighth to thirteenth row sensor electrodes HE8 to HE13. The seventh row sensor electrode HE7 may be disposed at a boundary between the first area A1 and the second area A2 and may have a structure corresponding to that of the sensor electrodes disposed in the first area A1, however, this is merely an example. According to an embodiment, the first sensor electrode HE might not be disposed at the boundary between the first area A1 and the second area A2 and should not necessarily be particularly limited thereto.

The first to seventh row sensor electrodes HE1 to HE7 may be respectively electrically connected to the sensor pads via the sensor lines. For example, the number of the sensor lines electrically connected to each of the first to seventh row sensor electrodes HE1 to HE7 may be equal to or greater than two. In the present embodiment, each of the first to seventh row sensor electrodes HE1 to HE7 is electrically connected to the sensor pad areas PA_TL and PA_TR via two sensor lines. Each of the first to seventh row sensor electrodes HE1 to HE7 may be electrically connected to one of left first sensor pads P_HL via one of the left first sensor lines HL-L and may be electrically connected to one of right first sensor pads P_HR via one of the right first sensor lines HL-R.

A plurality of contact portions CTa and CTb corresponding to the sensor lines electrically connected to each of the first to seventh row sensor electrodes HE1 to HE7 may be formed in each of the first to seventh row sensor electrodes HE1 to HE7. For example, a first contact portion CTa and a second contact portion CTb, which are spaced apart from each other in the first direction DR1, may be disposed in the first row sensor electrode HE1. The first contact portion CTa and the second contact portion CTb, which are spaced apart from each other in the first direction DR1, may also be disposed in the second row sensor electrode HE2. In the present embodiment, the contact portions CTa and CTb of the first row sensor electrode HE1 may be disposed in one sensor pattern, and the contact portions CTa and CTb of the second row sensor electrode HE2 may be disposed in different sensor pattern from each other, however, these are merely examples. Positions of the contact portions CTa and CTb may be changed in various ways as long as plural contact portions CTa and CTb are provided in one of the first sensor electrodes HE and should not necessarily be particularly limited thereto.

The number of sensor lines electrically connected to each of the eighth to thirteenth row sensor electrodes HE8 to HE13 may be equal to or greater than one and may be smaller than the number of sensor lines electrically connected to the first to seventh row sensor electrodes HE1 to HE7 disposed in the first area A1. In the present embodiment, as the number of the sensor lines electrically connected to each of the first to seventh row sensor electrodes HE1 to HE7 is designed to be two, the number of the sensor lines electrically connected to each of the eighth to thirteenth row sensor electrodes HE8 to HE13 disposed in the second area A2 may be one.

For example, each of the eighth to thirteenth row sensor electrodes HE8 to HE13 may be electrically connected to one of the left first sensor pads P_HL via one of the left first sensor lines HL-L or may be electrically connected to one of the right first sensor pads P_HR via one of the right first sensor lines HL-R. Accordingly, a single contact portion CT may be formed in each of the eighth to thirteenth row sensor electrodes HE8 to HE13. For example, the twelfth row sensor electrode HE12 among the eighth to thirteenth row sensor electrodes HE8 to HE13 may be electrically connected to the left first sensor pad P_HL only via the left first sensor line HL-L, and the thirteenth row sensor electrode HE13 among the eighth to thirteenth row sensor electrodes HE8 to HE13 may be electrically connected to the right first sensor pad P_HR only via the right first sensor line HL-R.

In the present disclosure, the number of the first sensor electrodes disposed in the first area A1 and the number of the first sensor electrodes disposed in the second area A2 may be designed in various ways and should not necessarily be particularly limited thereto. As an example, the number of the first sensor electrodes disposed in the first area A1 may be one, and the other first sensor electrodes may be disposed in the second area A2. According to an embodiment, one first sensor electrode may be disposed in the second area A2, and the other first sensor electrodes may be disposed in the first area A1. In the present disclosure, the first area A1 and the second area A2 may have various sizes as long as the first area A1 includes the first row sensor electrode HE1 and the second area A2 includes the last row sensor electrode HE13 and should not necessarily be particularly limited thereto.

In the present embodiment, first sensor lines HL may extend to the pad area PA_TL and PA_TR from the sensing area SA. The first sensor lines HL may be spaced apart from each other in the sensing area SA in a plan view. Accordingly, the first sensor lines HL may have a longer length than that of the second sensor lines VL, and an overlap area between the first sensor lines HL and the sensing area SA, particularly, an overlap area between the first sensor lines HL and the sensor electrodes HE and VE, may be greater than an overlap area between the second sensor lines VL and the sensor electrodes HE and VE.

Since electrical signals are provided to the first sensor electrode HE via first sensor lines HL, a parasitic capacitance may be formed between the first sensor lines HL and the second sensor electrode VE overlapping the first sensor lines HL. This electrical interference may cause a noise such as a ghost touch when the external input applied to the sensing area SA is sensed.

According to the present disclosure, as the sensor line electrically connected to the first sensor electrode HE is disposed to overlap the sensing area SA (refer to FIG. 1B), a size of the peripheral area NSA may be reduced in the first direction DR1. Accordingly, the size of the bezel area BZA (refer to FIG. 1B) may be reduced, and thus, the electronic device with the narrow-bezel may be provided. However, as the first sensor line electrically connected to the first sensor electrode HE passes through the active area AA, a parasitic capacitance may be formed between the first sensor line of the active area AA and the second sensor electrode VE overlapping the first sensor line.

According to the present disclosure, as two or more sensor lines are electrically connected to one first sensor electrode HE, a load applied to one first sensor line may be reduced. For example, as the number of paths through which the electrical signal is provided to the first sensor electrode HE increases, an amount of charges moving through one path may be reduced, and thus, the electrical interference of each of the first sensor lines HL-L and HL-R with respect to the second sensor electrode VE overlapping thereto may be reduced. According to the present disclosure, the parasitic capacitance formed between the first sensor lines HL-L and HL-R and the second sensor electrode VE may be reduced, the noise may be reduced, and the sensitivity of the sensor part 220 may be increased.

In addition, according to the present disclosure, as the number of the sensor lines is changed depending on a distance from the sensor pad areas PA_TL and PA_TR, an overcrowding of the sensor lines may be prevented. For example, the length of the sensor line electrically connected to each of the first sensor electrodes HE1 to HE6 disposed in the first area A1 may be greater than the length of the sensor lines electrically connected to each of the first sensor electrodes HE8 to HE13 disposed in the second area A2. Accordingly, the sensor lines may be designed to allow the number of the sensor lines having a relatively long length among the first sensor lines HL to be greater than the number of the sensor lines having a relatively short length among the sensor lines HL. For example, one or more sensor lines are provided to the sensor electrodes with less parasitic capacitance, but the number of the sensor lines provided to the sensor electrodes with less parasitic capacitance is designed to be smaller than the number of the sensor lines electrically connected to the sensor electrodes disposed in the first area A1. Thus, noise occurrence may be reduced, and the number of the sensor lines HL_L and HL-R may be prevented from increasing excessively.

The first row sensor electrode HE1, which is located farthest from sensor pad areas PA_TL and PA_TR in the second direction DR2, may be electrically connected to more sensor lines than the thirteenth row sensor electrode HE13, which is located closest to the sensor pad areas PA_TL and PA_TR in the second direction DR2. The length of each of the sensor lines electrically connected to the first row sensor electrode HE1 may be greater than the length of the sensor line electrically connected to the thirteenth row sensor electrode HE13. According to the present disclosure, since the sensor line electrically connected to the thirteenth row sensor electrode HE13 is provided in singular and the sensor lines electrically connected to the first row sensor electrode HE1 are provided in plural, the load of each of the sensor lines electrically connected to the first row sensor electrode HE1 may be reduced. Accordingly, the parasitic capacitance between the sensor lines electrically connected to the first row sensor electrode HE1 and the second sensor electrode VE may be reduced, and defects such as the noise occurrence may be reduced. In addition, the number of the sensor lines provided to the thirteenth row sensor electrode HE13, which has a relatively short length, may be designed to one or may be designed to be smaller than the number of the sensor lines provided to the electrodes having a relatively long length, and thus, the number of the signal lines may be prevented from excessively increasing. Therefore, the overcrowding of the signal lines may be prevented, and an electrical interference, such as a coupling phenomenon, between the signal lines may be reduced.

Figure 3:
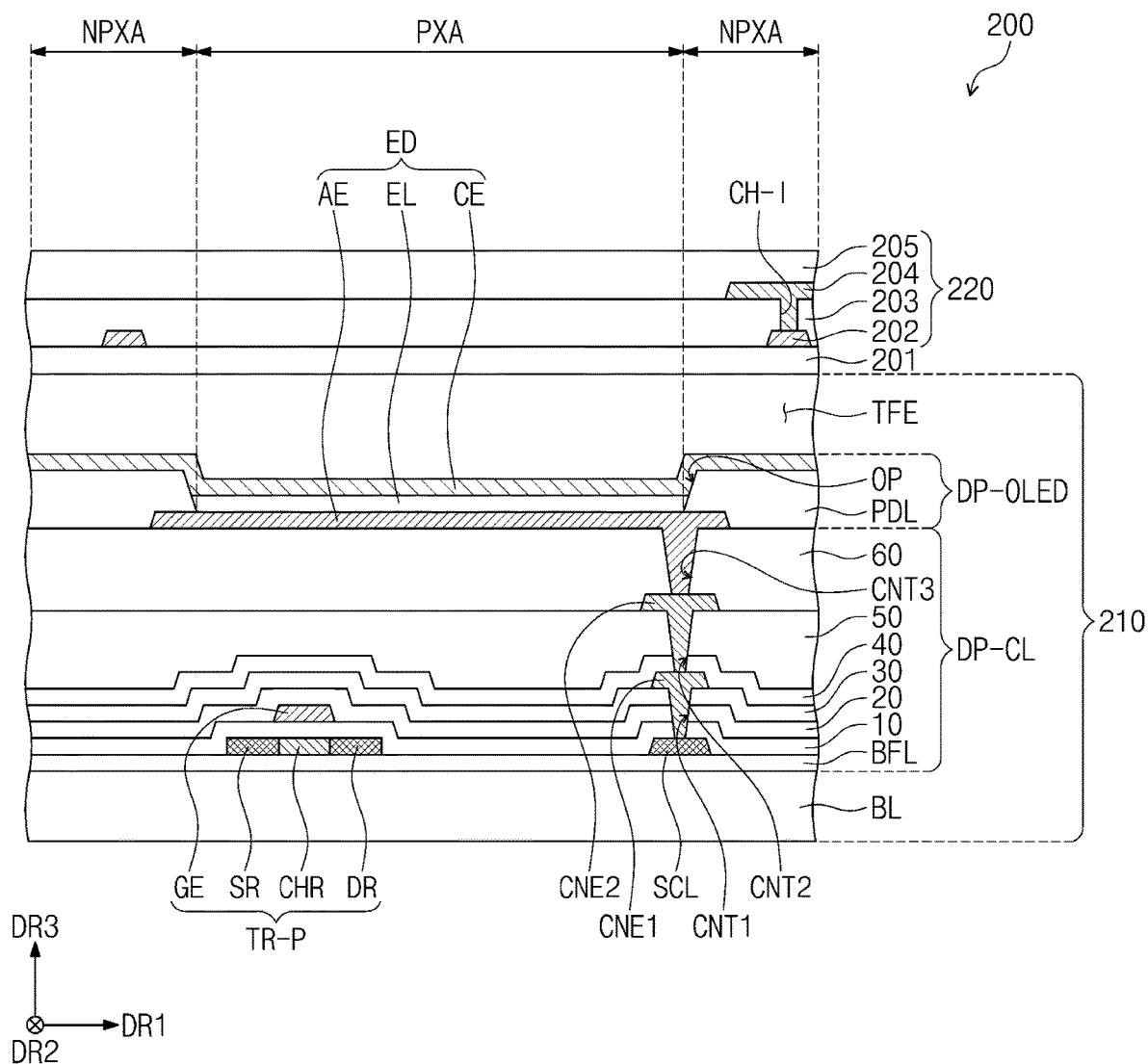
FIG. 3 is a cross-sectional view of an electronic panel according to an embodiment of the present disclosure.

FIG. 3 is a cross-sectional view of the electronic panel 200 according to an embodiment of the present disclosure. Referring to FIG. 3, the sensor part 220 may be disposed on the display part 210 in the electronic panel 200, however, this is merely an example. A stacked relationship between the sensor part 220 and the display part 210 may be changed in various ways and should not necessarily be particularly limited thereto.

The display part 210 may include the base layer BL, a circuit element layer DP-CL, a display element layer DP-OLED, and an encapsulation layer TFE.

The base layer BL may provide a base surface on which the circuit element layer DP-CL is disposed. The base layer BL may be a rigid substrate or a flexible substrate that is bendable, foldable, or rollable. The base layer BL may be a glass substrate, a metal substrate, or a polymer substrate, however, it should not necessarily be limited thereto or thereby. According to an embodiment, the base layer BL may be an inorganic layer, an organic layer, or a composite material layer.

The base layer BL may have a multi-layer structure. For instance, the base layer BL may include a first synthetic resin layer, an inorganic layer having a single-layer or multi-layer structure, and a second synthetic resin layer disposed on the inorganic layer having the single-layer or multi-layer structure. Each of the first and second synthetic resin layers may include a polyimide-based resin, however, it should not necessarily be particularly limited thereto.

The circuit element layer DP-CL may be disposed on the base layer BL. The circuit element layer DP-CL may include an insulating layer, a semiconductor pattern, a conductive pattern, and a signal line. An insulating layer, a semiconductor layer, and a conductive layer may be formed on the base layer BL by a coating or depositing process. Then, the insulating layer, the semiconductor layer, and the conductive layer may be selectively patterned through several photolithography processes. The semiconductor pattern, the conductive pattern, and the signal line included in the circuit element layer DP-CL may be formed.

At least one inorganic layer may be formed on an upper surface of the base layer BL. The inorganic layer may include aluminum oxide, titanium oxide, silicon oxide, silicon oxynitride, zirconium oxide, and/or hafnium oxide. The inorganic layer may be formed in multiple layers. The inorganic layers may form a barrier layer and/or a buffer layer. In the present embodiment, the electronic panel 200 includes a buffer layer BFL as one of the inorganic layers.

The buffer layer BFL may increase an adhesion between the base layer BL and the semiconductor pattern. The buffer layer BFL may include silicon oxide, silicon nitride layer, and/or silicon oxynitride. As an example, the buffer layer BFL may have a structure in which a silicon oxide layer and a silicon nitride layer are alternately stacked with each other.

The semiconductor pattern may be disposed on the buffer layer BFL. The semiconductor pattern may include polysilicon, however, it should not necessarily be limited thereto or thereby. The semiconductor pattern may include amorphous silicon, low-temperature polycrystalline silicon, or oxide semiconductor.

FIG. 3 shows only a portion of the semiconductor pattern, and the semiconductor pattern may be further disposed in other areas. The semiconductor pattern may be arranged with a specific rule over the pixels. The semiconductor pattern may have different electrical properties depending on whether it is doped or not or whether it is doped with an N-type dopant or a P-type dopant. The semiconductor pattern may include a first region having high conductivity and a second region having low conductivity. The first region may be doped with the N-type dopant or the P-type dopant. A P-type transistor may include a doped region doped with the P-type dopant, and an N-type transistor may include a doped region doped with the N-type dopant. The second region may be a non-doped region or may be doped at a low concentration compared with the first region.

The first region may have the conductivity that is greater than that of the second region and may substantially serve as an electrode or signal line. The second region may substantially correspond to an active (or a channel) of a transistor. For example, a portion of the semiconductor pattern may be the active of the transistor, another portion of the semiconductor pattern may be a source or a drain of the transistor, and the other portion of the semiconductor pattern may be a connection electrode or a connection signal line.

Each of the pixels may have an equivalent circuit that includes seven transistors, one capacitor, and a light emitting element, and the equivalent circuit of the pixel may be changed in various ways. FIG. 3 shows one transistor TR-P and the light emitting element ED included in one pixel.

A source SR, a channel CHR, and a drain DR of the transistor TR-P may be formed from the semiconductor pattern. The source SR and the drain DR may be provided in opposite directions to each other from the channel CHR in a cross-section. FIG. 3 shows a portion of a signal line SCL disposed on the same layer as the semiconductor pattern. The signal line SCL may be electrically connected to the transistor TR-P in a plan view.

A first insulating layer 10 may be disposed on the buffer layer BFL. The first insulating layer 10 may commonly overlap the pixels and may cover the semiconductor pattern. The first insulating layer 10 may be an inorganic layer and/or an organic layer and may have a single-layer or multi-layer structure. The first insulating layer 10 may include aluminum oxide, titanium oxide, silicon oxide, silicon nitride, silicon oxynitride, zirconium oxide, and/or hafnium oxide. In the present embodiment, the first insulating layer 10 may have a single-layer structure of a silicon oxide layer. Not only the first insulating layer 10, but also an insulating layer of the circuit element layer DP-CL described later may be an inorganic layer and/or an organic layer and may have a single-layer or multi-layer structure. The inorganic layer may include at least one of the above-mentioned materials, however, it should not necessarily be limited thereto.

A gate GE of the transistor TR-P may be disposed on the first insulating layer 10. The gate GE may be a portion of a metal pattern. The gate GE may overlap the channel CHR. The gate GE may be used as a mask in a process of doping the semiconductor pattern.

A second insulating layer 20 may be disposed on the first insulating layer 10 and may cover the gate GE. The second insulating layer 20 may commonly overlap the pixels. The second insulating layer 20 may be an inorganic layer and/or an organic layer and may have a single-layer or multi-layer structure. In the present embodiment, the second insulating layer 20 may have a single-layer structure of a silicon oxide layer.

A third insulating layer 30 may be disposed on the second insulating layer 20. In the present embodiment, the third insulating layer 30 may have a single-layer structure of a silicon oxide layer. A first connection electrode CNE1 may be disposed on the third insulating layer 30. The first connection electrode CNE1 may be electrically connected to the signal line SCL via a contact hole CNT1 defined through the first, second, and third insulating layers 10, 20, and 30.

A fourth insulating layer 40 may be disposed on the third insulating layer 30. The fourth insulating layer 40 may have a single-layer structure of a silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be electrically connected to the first connection electrode CNE1 via a contact hole CNT2 defined through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer. The display element layer DP-OLED may be disposed on the circuit element layer DP-CL. The display element layer DP-OLED may include the light emitting element ED. For example, the display element layer DP-OLED may include an organic light emitting material, a quantum dot, a quantum rod, a micro-LED, or a nano-LED. The light emitting element ED may include a first electrode AE, a light emitting layer EL, and a second electrode CE.

The first electrode AE may be disposed on the sixth insulating layer 60. The first electrode AE may be electrically connected to the second connection electrode CNE2 via a contact hole CNT3 defined through the sixth insulating layer 60.

A pixel definition layer PDL may be disposed on the sixth insulating layer 60 and may cover a portion of the first electrode AE. An opening OP may be defined through the pixel definition layer PDL. At least a portion of the first electrode AE may be exposed through the opening OP of the pixel definition layer PDL. In the present embodiment, a light emitting area PXA may to correspond to the portion of the first electrode AE exposed through the opening OP. A non-light-emitting area NPXA may at least partially surround the light emitting area PXA.

The light emitting layer EL may be disposed on the first electrode AE. The light emitting layer EL may be disposed in the opening OP. For example, the light emitting layer EL may be formed in each of the pixels after being divided into plural portions. When the light emitting layer EL is formed in each of the pixels after being divided into plural portions, each of the light emitting layers EL may emit a light having at least one of blue, red, and green colors, however, it should not necessarily be limited thereto or thereby. The light emitting layer EL might not be divided into plural portions and may be commonly provided over the pixels. In this case, the light emitting layer EL may provide a blue light or a white light.

The second electrode CE may be disposed on the light emitting layer EL. The second electrode CE may have an integral shape and may be commonly disposed over the pixels. A common voltage may be applied to the second electrode CE, and the second electrode CE may be referred to as a common electrode.

A hole control layer may be disposed between the first electrode AE and the light emitting layer EL. The hole control layer may be commonly disposed in the light emitting area PXA and the non-light-emitting area NPXA. The hole control layer may include a hole transport layer and may further include a hole injection layer. An electron control layer may be disposed between the light emitting layer EL and the second electrode CE. The electron control layer may include an electron transport layer and may further include an electron injection layer. The hole control layer and the electron control layer may be commonly formed in the plural pixels using an open mask.

The encapsulation layer TFE may be disposed on the display element layer DP-OLED. The encapsulation layer TFE may include an inorganic layer, an organic layer, and an inorganic layer, which are sequentially stacked, however, the layers of the encapsulation layer TFE should not necessarily be limited thereto or thereby.

The inorganic layers may protect the display element layer DP-OLED from moisture and oxygen, and the organic layer may protect the display element layer DP-OLED from a foreign substance such as dust particles. The inorganic layers may include a silicon nitride layer, a silicon oxynitride layer, a silicon oxide layer, a titanium oxide layer, or an aluminum oxide layer. The organic layer may include an acrylic-based organic layer, however, it should not necessarily be limited thereto or thereby.

The sensor part 220 may be disposed on the encapsulation layer TFE. In the present embodiment, the sensor part 220 may be directly formed on an upper surface of the encapsulation layer TFE through successive processes, however, this is merely an example. According to an embodiment, the sensor part 220 may be attached on the encapsulation layer TFE by an adhesive layer after being separately formed.

The sensor part 220 may include a sensor base layer 201, a first conductive layer 202, a sensor insulating layer 203, a second conductive layer 204, and a cover insulating layer 205. The sensor base layer 201 may be an inorganic layer including silicon nitride, silicon oxynitride, and/or silicon oxide. According to an embodiment, the sensor base layer 201 may include an organic layer including an epoxy-based resin, an acrylic-based resin, or an imide-based resin. The sensor base layer 201 may have a single-layer structure or a multi-layer structure of layers stacked in the third direction DR3.

Each of the first conductive layer 202 and the second conductive layer 204 may form the sensor electrodes HE and VE (refer to FIG. 2B). As an example, the first sensor pattern SP1, the second sensor pattern SP2, and the first connection pattern BP1 (refer to FIG. 2B) may form the second conductive layer 204, and the second connection pattern BP2 (refer to FIG. 2B) may form the first conductive layer 202. According to an embodiment, the second connection pattern BP2 may form the second conductive layer 204, and the first connection pattern BP1 may form the first conductive layer 202. According to an embodiment, one of the first sensor electrode HE and the second sensor electrode VE may form the first conductive layer 202, and the other of the first sensor electrode HE and the second sensor electrode VE may form the second conductive layer 204. The sensor electrodes HE and VE may be designed in various ways as long as they are not short-circuited with each other, and the present disclosure should not necessarily be particularly limited to any one particular approach.

Each of the first conductive layer 202 and the second conductive layer 204 may have a single-layer structure or a multi-layer structure of layers stacked in the third direction DR3.

The conductive layer having the single-layer structure may include a metal layer or a transparent conductive layer. The metal layer may include molybdenum, silver, titanium, copper, aluminum, or alloys thereof. The transparent conductive layer may include a transparent conductive oxide, such as indium tin oxide (ITO), indium zinc oxide (IZO), zinc oxide (ZnO), indium zinc tin oxide (ITZO), or the like. In addition, the transparent conductive layer may include a conductive polymer such as PEDOT, a metal nanowire, a graphene, or the like.

The conductive layer having the multi-layer structure may include metal layers. As an example, the metal layers may have a three-layer structure of titanium/aluminum/titanium. The conductive layer having the multi-layer structure may include at least one metal layer and at least one transparent conductive layer.

At least one of the sensor insulating layer 203 and the cover insulating layer 205 may include an inorganic layer. The inorganic layer may include aluminum oxide, titanium oxide, silicon oxide, silicon nitride, silicon oxynitride, zirconium oxide, and/or hafnium oxide.

At least one of the sensor insulating layer 203 and the cover insulating layer 205 may include an organic layer. The organic layer may include an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, and/or a perylene-based resin.

Figure 4A:
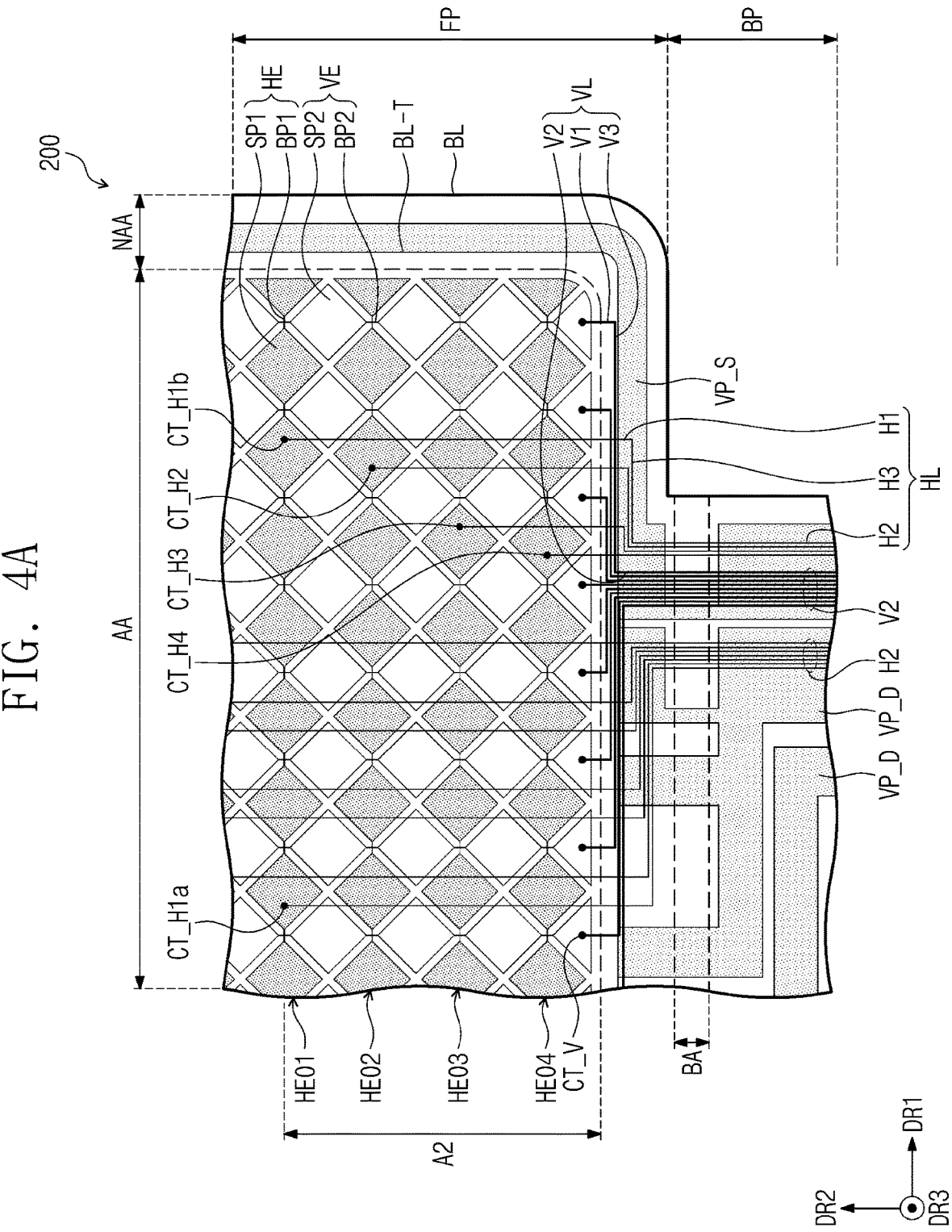
FIG. 4A is an enlarged view of an electronic panel according to an embodiment of the present disclosure.
Figure 4B:
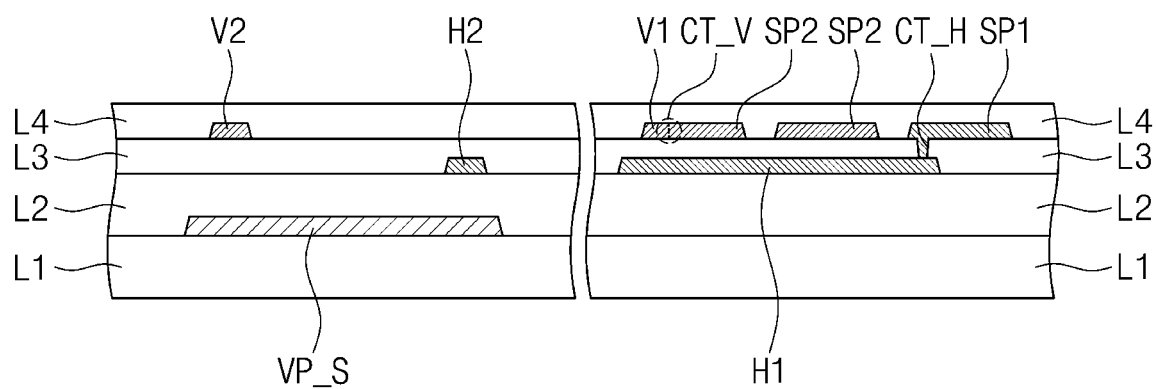
FIG. 4B is a cross-sectional view of a portion of the electronic panel of FIG. 4A.
Figure 5A:
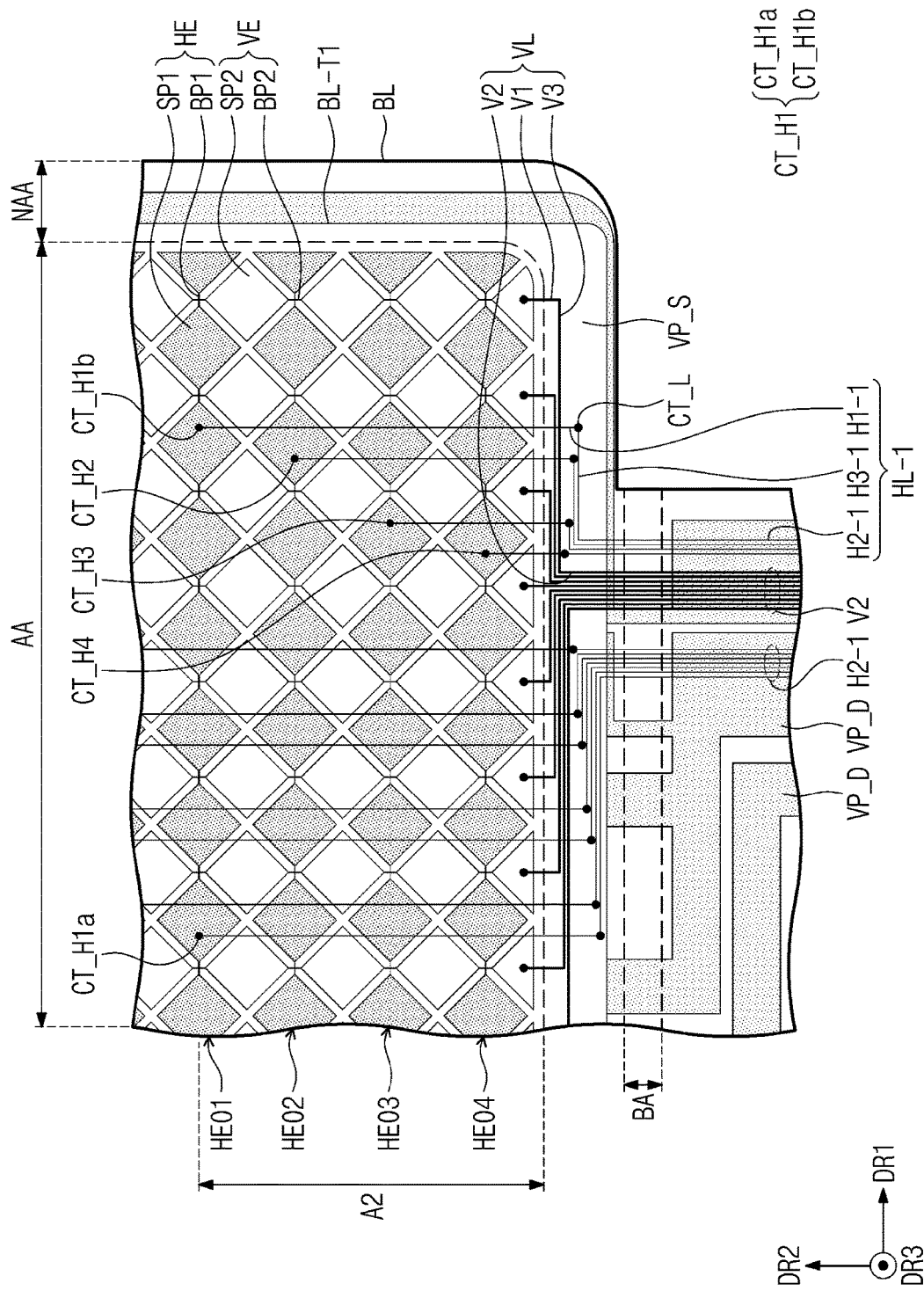
FIG. 5A is an enlarged view of an electronic panel according to an embodiment of the present disclosure.
Figure 5B:
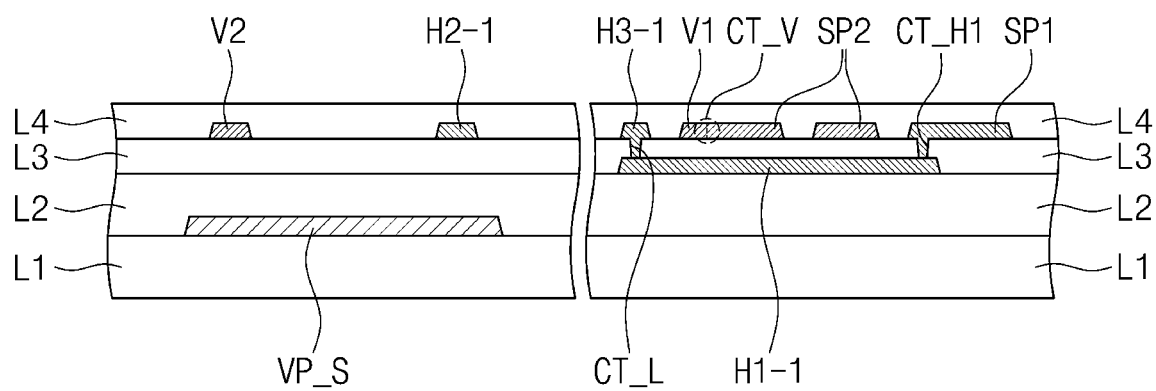
FIG. 5B is a cross-sectional view of a portion of the electronic panel of FIG. 5A.

FIG. 4A is an enlarged view of the electronic panel 200 according to an embodiment of the present disclosure. FIG. 4B is a cross-sectional view of a portion of the electronic panel 200 of FIG. 4A. FIG. 5A is an enlarged view of an electronic panel according to an embodiment of the present disclosure. FIG. 5B is a cross-sectional view of a portion of the electronic panel of FIG. 5A. FIG. 5A shows an area corresponding to that of FIG. 4A, and FIG. 5B shows an area corresponding to that of FIG. 4B. It is to be understood that there may be additional elements besides the elements shown. Hereinafter, the present disclosure will be described with reference to FIGS. 4A to 5B.

FIG. 4A shows a portion of an adjacent area of the flat portion FP and the bending portion BP. In the area shown in FIG. 4A, the sensor electrodes HE and VE may be disposed on the encapsulation layer TFE. The first power pattern VP_D and the second power pattern VP_S may be disposed under the encapsulation layer TFE, and portions of the first power pattern VP_D and the second power pattern VP_S may be exposed without being covered by the encapsulation layer TFE and may extend to the bending portion BP.

The first and second sensor lines HL and VL may overlap the first and second power patterns VP_D and VP_S in a plan view. The first and second sensor lines HL and VL may be disposed on a layer different from a layer on which the first and second power patterns VP_D and VP_S are disposed, and at least one insulating layer may be interposed between a layer comprising the first and second sensor lines HL and VL and a layer comprising the first and second power patterns VP_D and VP_S. Accordingly, the first and second sensor lines HL and VL may be electrically insulated from the first and second power patterns VP_D and VP_S.

The second sensor lines VL may be respectively electrically connected to corresponding second sensor electrodes VE via second sensor contact portions CT_V. The second sensor contact portions CT_V may be respectively provided in the second sensor patterns SP2 closest to the bending portion BP. Accordingly, the second sensor contact portions CT_V may be arranged in the first direction DR1. Portions of the second sensor lines VL, which overlap the active area AA, may have substantially the same length as each other.

Each of the second sensor lines VL may include a first vertical portion V1, a second vertical portion V2, and a horizontal portion V3. The first vertical portion V1 may overlap the active area AA, may define the second sensor contact portion CT_V, and may extend in the second direction DR2. The second vertical portion V2 may be spaced apart from the active area AA when viewed in the plan and may extend in the second direction DR2. The horizontal portion V3 may connect the first vertical portion V1 to the second vertical portion V2 and may extend in the first direction DR1. In the present embodiment, the first vertical portion V1, the second vertical portion V2, and the horizontal portion V3 may be disposed on the same layer and may be electrically connected to each other to form the second sensor line VL with an integral shape.

The first sensor lines HL may be respectively electrically connected to corresponding first sensor electrodes HE via first sensor contact portions CT_H1, CT_H2, CT_H3, and CT_H4. In the present embodiment, for the convenience of explanation, four first sensor electrodes HE01, HE02, HE03, and HE04 are shown, and the first sensor electrodes HE01, HE02, HE03, and HE04 may include one sensor electrode HE01 (hereinafter, referred to as a first row sensor electrode) corresponding to the first sensor electrode disposed in the first area A1 (refer to FIG. 2B) and three sensor electrodes HE02, HE03, and HE04 (hereinafter, referred to as second, third, and fourth row sensor electrodes) corresponding to the first sensor electrode disposed in the second area A2 (refer to FIG. 2B). The first sensor contact portion CT_H1 disposed in the first row sensor electrode HE01 comprises two contact portions CT_H1a and CT_H1b. Accordingly, two contact portions CT_H1a and CT_H1b provided in the first row sensor electrode HE01 and three contact portions CT_H2, CT_H3, and CT_H4 respectively provided in the second, third, and fourth row sensor electrodes HE02, HE03, and HE04 are shown in FIG. 4A.

The first sensor lines HL electrically connected to the first sensor contact portions CT_H1, CT_H2, CT_H3, and CT_H4 may be spaced apart from each other in a plan view and may be prevented from being electrically short-circuited. Accordingly, the first sensor contact portions CT_H1, CT_H2, CT_H3, and CT_H4 may be respectively disposed at positions spaced apart from each other in the first direction DR1. Since the first sensor contact portions CT_H1, CT_H2, CT_H3, and CT_H4 are provided in different first sensor electrodes HE from each other, the first sensor contact portions CT_H1, CT_H2, CT_H3, and CT_H4 may be respectively disposed at positions spaced apart from each other in the second direction DR2. Accordingly, the first sensor contact portions CT_H1, CT_H2, CT_H3, and CT_H4 may be respectively disposed at the positions spaced apart from each other in the first direction DR1 and the second direction DR2. Thus, the first sensor lines HL electrically connected to the first sensor contact portions CT_H1, CT_H2, CT_H3, and CT_H4 may have different lengths from each other in the second direction DR2. This is merely an example, and the first sensor contact portions CT_H1, CT_H2, CT_H3, and CT_H4 may be disposed in various ways as long as the first sensor lines HL are not interfered with each other and should not necessarily be particularly limited thereto.

Each of the first sensor lines HL may include a first vertical portion H1, a second vertical portion H2, and a horizontal portion H3. The first vertical portion H1 may overlap the active area AA, may define the first sensor contact portion, and may extend in the second direction DR2. The second vertical portion H2 may be spaced apart from the active area AA in a plan view and may extend in the second direction DR2. The horizontal portion H3 may connect the first vertical portion H1 to the second vertical portion H2 and may extend in the first direction DR1. In the present embodiment, the first vertical portion H1, the second vertical portion H2, and the horizontal portion H3 may be disposed on the same layer and may be electrically connected to each other to form the first sensor line HL with an integral shape.

The first vertical portion H1 of the first sensor line HL whose at least a portion overlaps the active area AA may have a longer length than the first vertical portion V1 of the second sensor line VL in the second direction DR2. For example, an overlap area between the first sensor line HL and the active area AA may be greater than an overlap area between the second sensor line VL and the active area AA, and thus the first sensor line HL may have a greater effect on the sensing sensitivity.

According to the present disclosure, the sensor electrode HE01, which is disposed farther away from the bending portion BP, may be provided with a larger number of contact portions CT_H1a and CT_H1b, and thus, may be electrically connected to a larger number of sensor lines. Accordingly, as the load provided to one sensor line is distributed to plural lines, an influence of each of the first vertical portions H1, which has a large overlapping area, on the second sensor electrode VE may be reduced. Even though a large load is provided to the first vertical portion H1, the influence on the active area AA may be small when the overlap area between the first vertical portion fil and the active area AA is small. Therefore, the number of the contact portions and the number of the sensor lines may be designed in various ways depending on the electrical interference on the active area AA, and thus, the sensitivity of the sensing area may be increased while preventing the sensor lines from being densely arranged. The first sensor lines HL may overlap the second sensor lines VL in the peripheral area NAA in a plan view. For example, the first vertical portion H1 of each of the first sensor lines HL may intersect the horizontal portion V3 of each of the second sensor lines VL in a plan view.

Referring to FIG. 4B, the second power pattern VP_S may be disposed between a first layer L1 and a second layer L2, and the first vertical portion H1 and the second vertical portion H2 of the first sensor line HL may be disposed between the second layer L2 and a third layer L3. The first sensor pattern SP1, the second sensor pattern SP2, and the first and second vertical portions V1 and V2 of the second sensor line VL may be disposed between the third layer L3 and a fourth layer L4. Each of the first, second, third, and fourth layers L1, L2, L3, and L4 may be an insulating layer and may correspond to one layer of the insulating layers shown in FIG. 3. As an example, the third layer L3 may correspond to the sensor insulating layer 203 (refer to FIG. 3), and the fourth layer L4 may correspond to the cover insulating layer 205 (refer to FIG. 3).

For example, the first sensor line HL, the second sensor line VL, and the second power pattern VP_S may be disposed on different layers from each other. The first sensor line HL may be disposed on a layer different from the sensor patterns SP1 and SP2. The first sensor contact portion CT_H may penetrate the third insulating layer L3 and may connect the first vertical portion H1 of the first sensor line HL and the first sensor pattern SP1. Accordingly, even though the overlap area between the first sensor line and the active area AA is large, the first sensor line might not be in contact with the sensor electrodes HE and VE. In addition, the first sensor line HL and the second sensor line VL may be disposed on different layers from each other. Therefore, the first vertical portion H1 of the first sensor line HL may be insulated from the horizontal portion H3 of the second sensor line VL while crossing the horizontal portion H3 of the second sensor line VL. Thus, the first sensor line HL may be prevented from being electrically short-circuited with the second sensor line VL, and a degree of freedom in design may be increased.

According to the present embodiment, as the second sensor line VL and the first and second sensor patterns SP1 and SP2 are disposed on the same layer, the first vertical portion V1 of the second sensor line VL and the second sensor contact portion CT_V may be provided integrally with the second sensor pattern SP2. The second sensor line VL may extend from an outermost portion of the active area AA, and thus, the second sensor line VL might not overlap the first sensor electrode HE. Accordingly, the second sensor line VL may be electrically connected to the second sensor pattern SP2 without penetrating a separate insulating layer. This is merely an example, the second sensor line VL and the second sensor pattern SP2 may be disposed on the same layer, and the second sensor line VL may overlap the second sensor pattern SP2. For example, the first vertical portion V1 of the second sensor line VL may be in contact with an upper surface or a lower surface of the second sensor pattern SP2, and it should not necessarily be particularly limited thereto.

As shown in FIGS. 5A and 5B, a first sensor line HL-1 may include portions H1-1, H2-1, and H3-1 disposed on different layers. As an example, a first vertical portion H1-1 may be disposed between a second layer L2 and a third layer L3, and a second vertical portion H2-1 and a horizontal portion H3-1 may be disposed on the first vertical portion H1-1. The horizontal portion H3-1 may be electrically connected to the first vertical portion H1-1 via a contact portion CT_L defined through the third layer L3.

According to the present disclosure, only the first vertical portion H1-1 of the first sensor line HL-1, which intersects a second sensor line VL, may be disposed on a layer different from the second sensor line VL, and the other portions H2-1 and H3-1 of the first sensor line HL-1 and the second sensor line VL may be disposed on the same layer. Accordingly, the second vertical portions H2-1 and V2 overlapping a first power pattern VP_D may be disposed on the same layer, and thus, a design of the lines directly electrically connected to the pads may be simplified.

This is merely an example, the first sensor lines HL and HL-1 and the second sensor line VL may be designed in various ways as long as the first sensor lines HL and HL-1 are not short-circuited with the second sensor line VL and should not necessarily be particularly limited to the arrangement described herein.

Figure 6A:
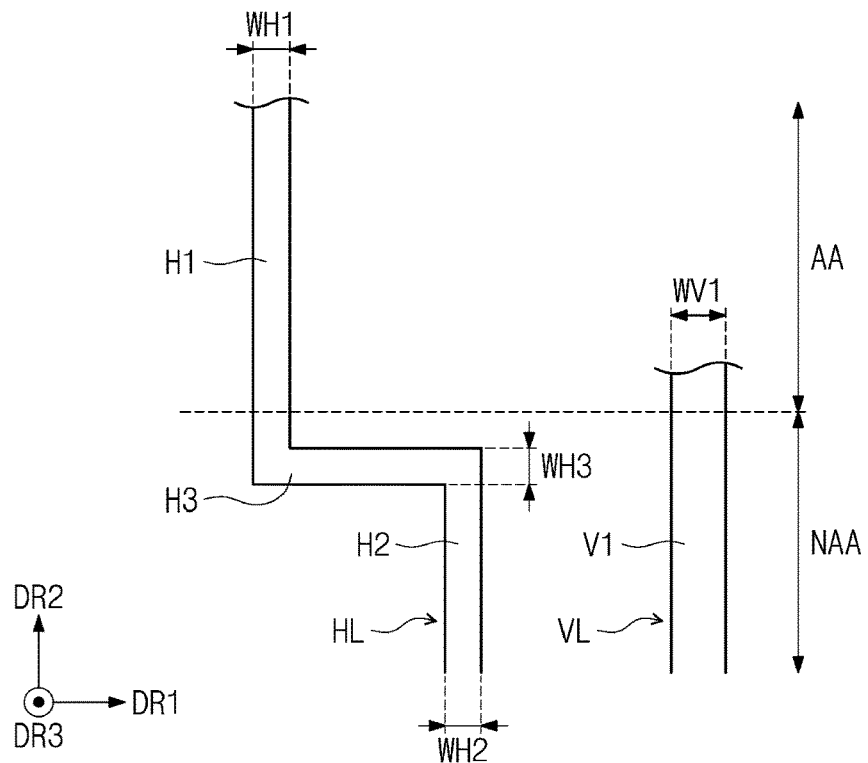
FIGS. 6A and 6B are plan views of a portion of an electronic panel according to embodiments of the present disclosure.
Figure 6B:
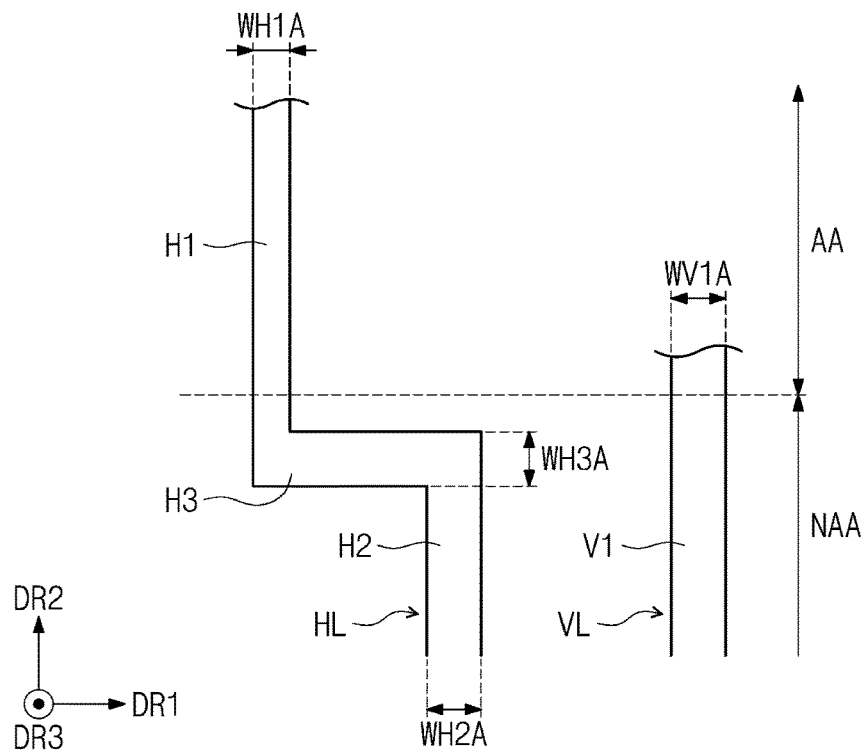

FIGS. 6A and 6B are plan views of a portion of the electronic panel according to embodiments of the present disclosure. FIGS. 6A and 6B show a portion of one first sensor line HL1 (refer to FIG. 4A) and a portion of the second sensor line VL1 (refer to FIG. 4A). An area shown in FIGS. 6A and 6B may include a boundary between the active area AA and the peripheral area NAA.

Referring to FIG. 6A, a width WH1 in the first direction DR1 of the first vertical portion H1 of the first sensor line HL may be smaller than a width WV1 in the first direction DR1 of each of the first vertical portion V1 of the second sensor line VL. Accordingly, a parasitic capacitance between one first vertical portion H1 and the second sensor electrodes VE (refer to FIG. 4A) may be reduced. Even though the area occupied by the first sensor line HL in the active area AA through the first vertical portion H1 is larger than that by the second sensor line VL, an electrical influence on the sensors in the active area AA may be reduced by decreasing the width of the first vertical portion H1.

Referring to FIG. 6B, a first sensor line HL (refer to FIG. 4A) may be designed to have different widths depending on its portions. As an example, each of a width WH2A in the first direction DR1 of a second vertical portion H2 of the first sensor line HL and a width WH3A in the second direction DR2 of a horizontal portion H3 may be greater than a width WH1A in the first direction DR1 of a first vertical portion H1. The width WH2A in the first direction DR1 of the second vertical portion H2 may be greater than the width WH2 shown in FIG. 6A, and the width WH3A in the second direction DR2 of the horizontal portion H3 may be greater than a width WH3 shown in FIG. 6A. In the present embodiment, the width WH2A in the first direction DR1 of the second vertical portion H2 may be substantially the same as a width WV1A in the first direction DR1 of a first vertical portion V1 of the second sensor line.

According to the present disclosure, as the width WH1A of the first vertical portion H1, which is mostly located in the active area AA, is narrowed, the noise occurring in the active area AA may be reduced. In addition, the widths WH2A and WH3A of the second vertical portion H2 and the horizontal portion H3 that do not overlap the active area AA may increase, and thus, a resistance across the first sensor line HL may be prevented from increasing. For example, as a portion of the first sensor line HL disposed in the active area AA decreases and a portion of the first sensor line HL disposed in the peripheral area NAA increases, the resistance of the first sensor line HL may be prevented from excessively increasing, and the noise may be reduced in the electronic panel 200.

Figure 7A:
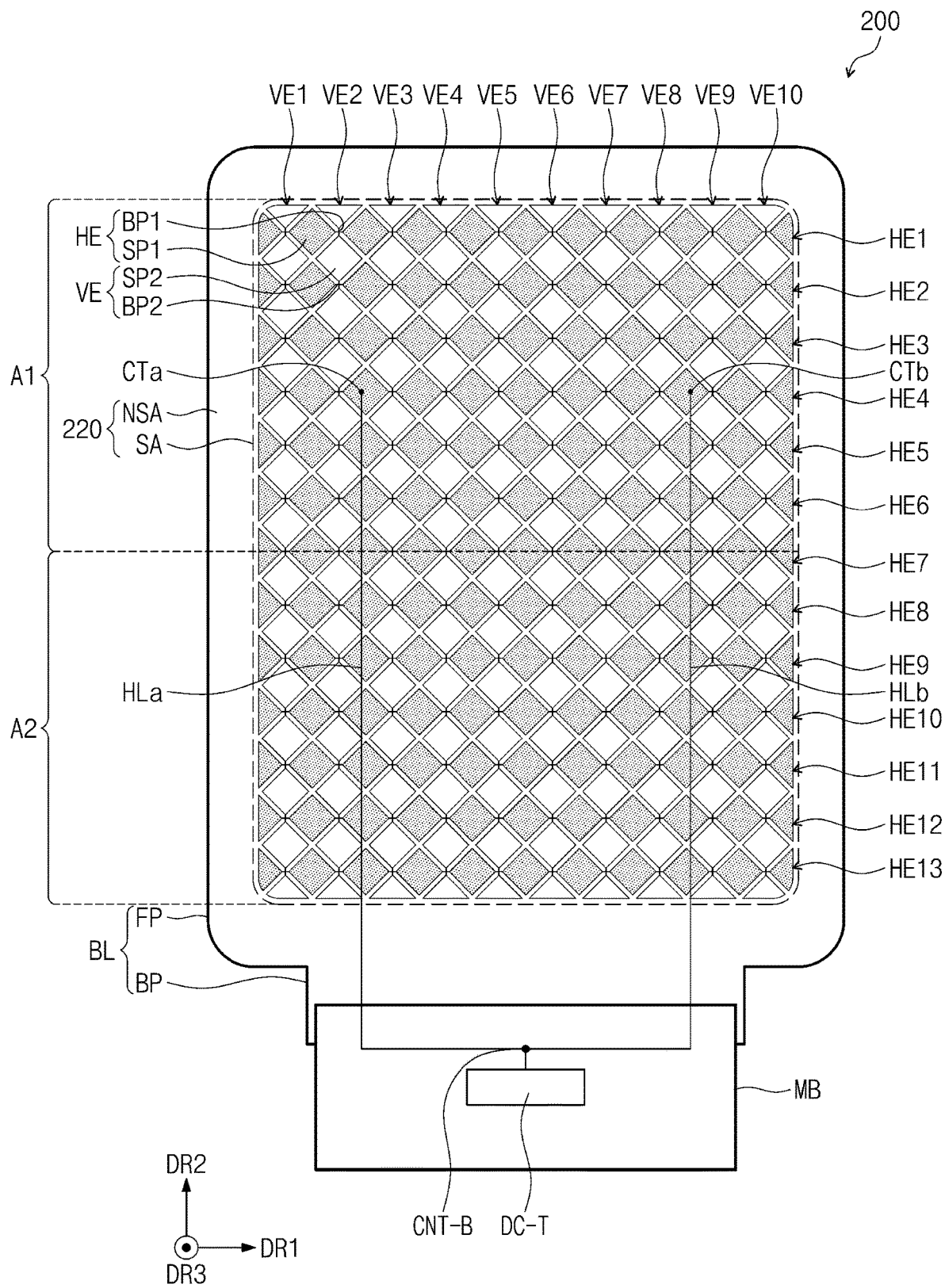
FIGS. 7A and 7B are plan views of an electronic panel according to an embodiment of the present disclosure.
Figure 7B:
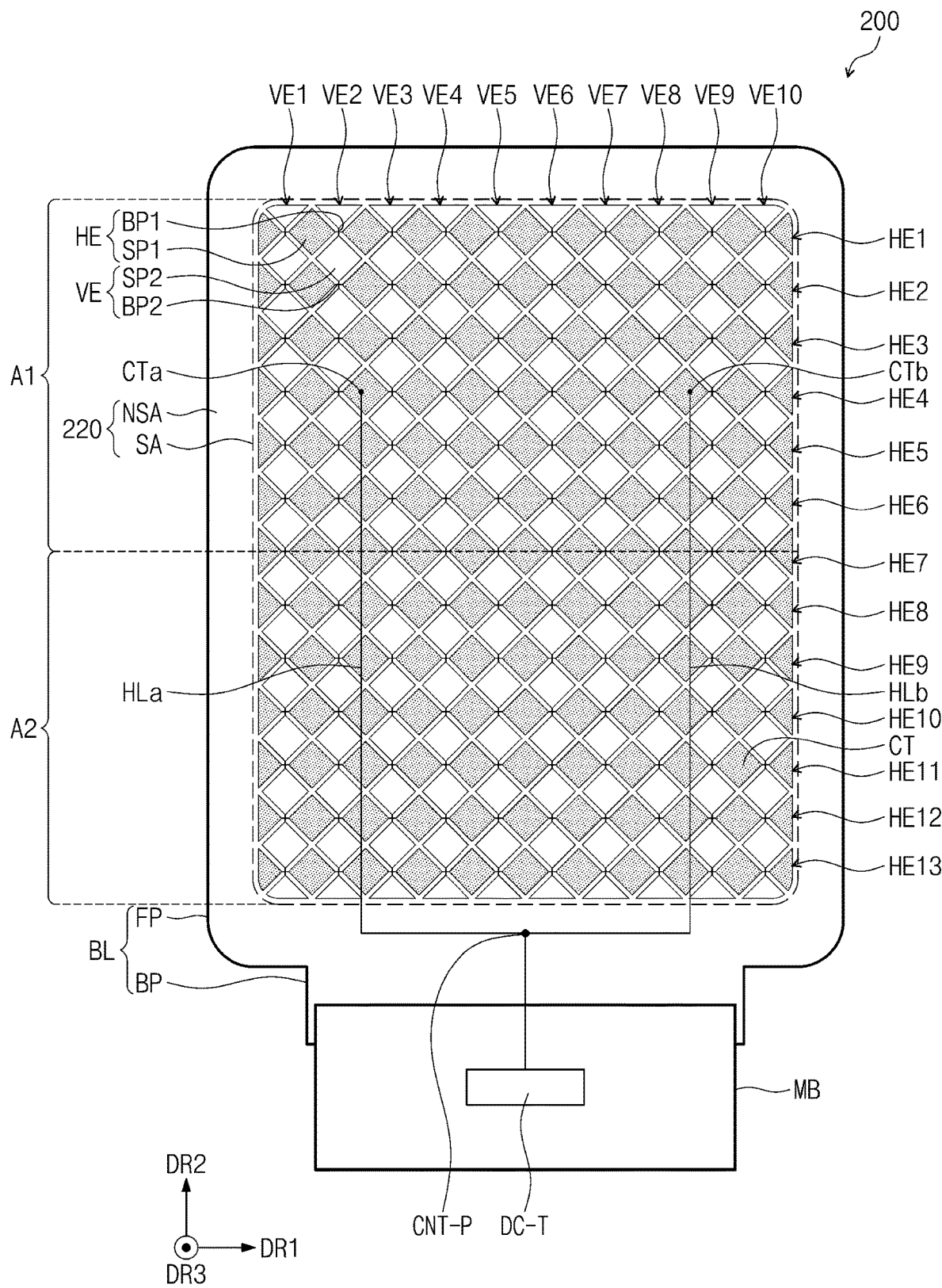

FIGS. 7A and 7B are plan views of electronic panels 200 according to embodiments of the present disclosure. For the convenience of explanation, the electronic panels 200 of FIGS. 7A and 7B are illustrated to correspond to that of FIG. 2B, and it is to be understood that there may be additional elements besides the elements shown.

Referring to FIGS. 7A and 7B, the electronic panel 200 may be coupled to a circuit board MB disposed on a bending portion BP. Each of sensor electrodes HE and VE may be electrically connected to a sensor driver DC-T of the circuit board MB via the sensor line. For the convenience of explanation, FIGS. 7A and 7B show only sensor lines HLa and HLb electrically connected to a fourth row sensor electrode HE4 among the sensor electrodes arranged in a first area A1 via contact portions CTa, CTb as a representative example, and other signal lines may also be present. The sensor lines HLa and HLb may be electrically connected to one sensor electrode HE4 and may transmit substantially the same signal.

As shown in FIG. 7A, the sensor lines HLa and HLb may extend along a direction parallel to the second direction, may be electrically connected to each other in the circuit board MB, and may be electrically connected to the sensor driver DC-T. Accordingly, a contact portion CNT-B at which the sensor lines HLa and HLb are electrically connected to each other may be disposed in the circuit board MB. For example, the sensor lines HLa and HLb may be respectively disposed in the sensor pads, may be independently electrically connected to the circuit board MB, and then, may be electrically connected to the sensor driver DC-T via the contact portion CNT-B disposed in the circuit board MB as a single path. The embodiment shown in FIG. 7A may substantially correspond to the sensor part 220 shown in FIG. 2B.

Referring to FIG. 7B, sensor lines HLa and HLb may be electrically connected to each other in the electronic panel 200 and then may be electrically connected to a sensor driver DC-T. Accordingly, a contact portion CNT-P at which the sensor lines HLa and HLb are electrically connected to each other may be disposed in the base layer BL. For example, the sensor lines HLa and HLb may be electrically connected to each other via the contact portion CNT-P and may be electrically connected to the circuit board MB via one common sensor pad. According to the present disclosure, since the single sensor pad is provided to the plural sensor lines HLa and HLb, the number of the sensor pads may be prevented from increasing. The sensor lines HLa and HLb may be designed in various ways as long as the sensor lines HLa and HLb transmit the same signal and should not necessarily be particularly limited thereto.

Figure 8A:
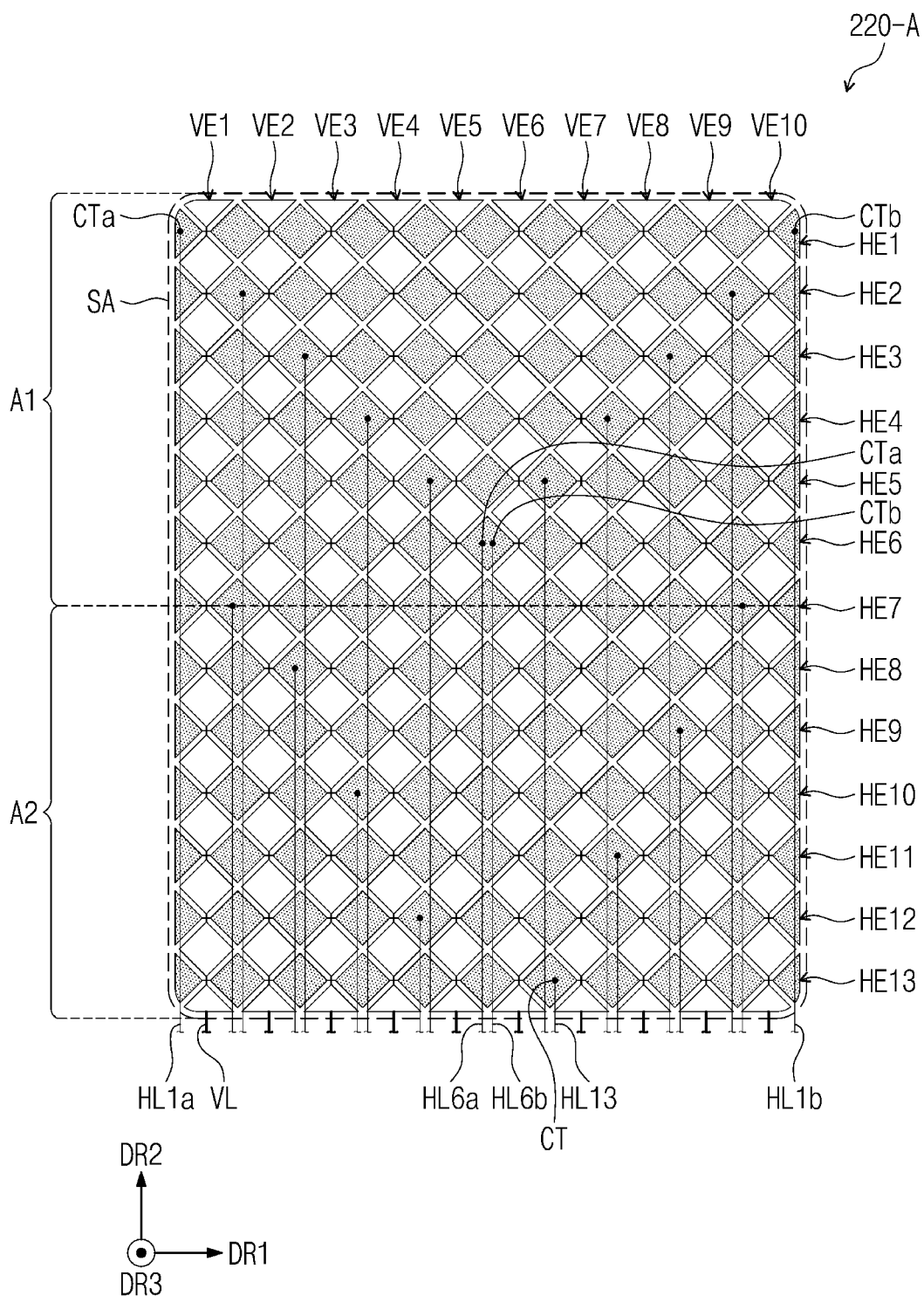
FIGS. 8A to 8C are plan views of sensor parts according to embodiments of the present disclosure.
Figure 8B:
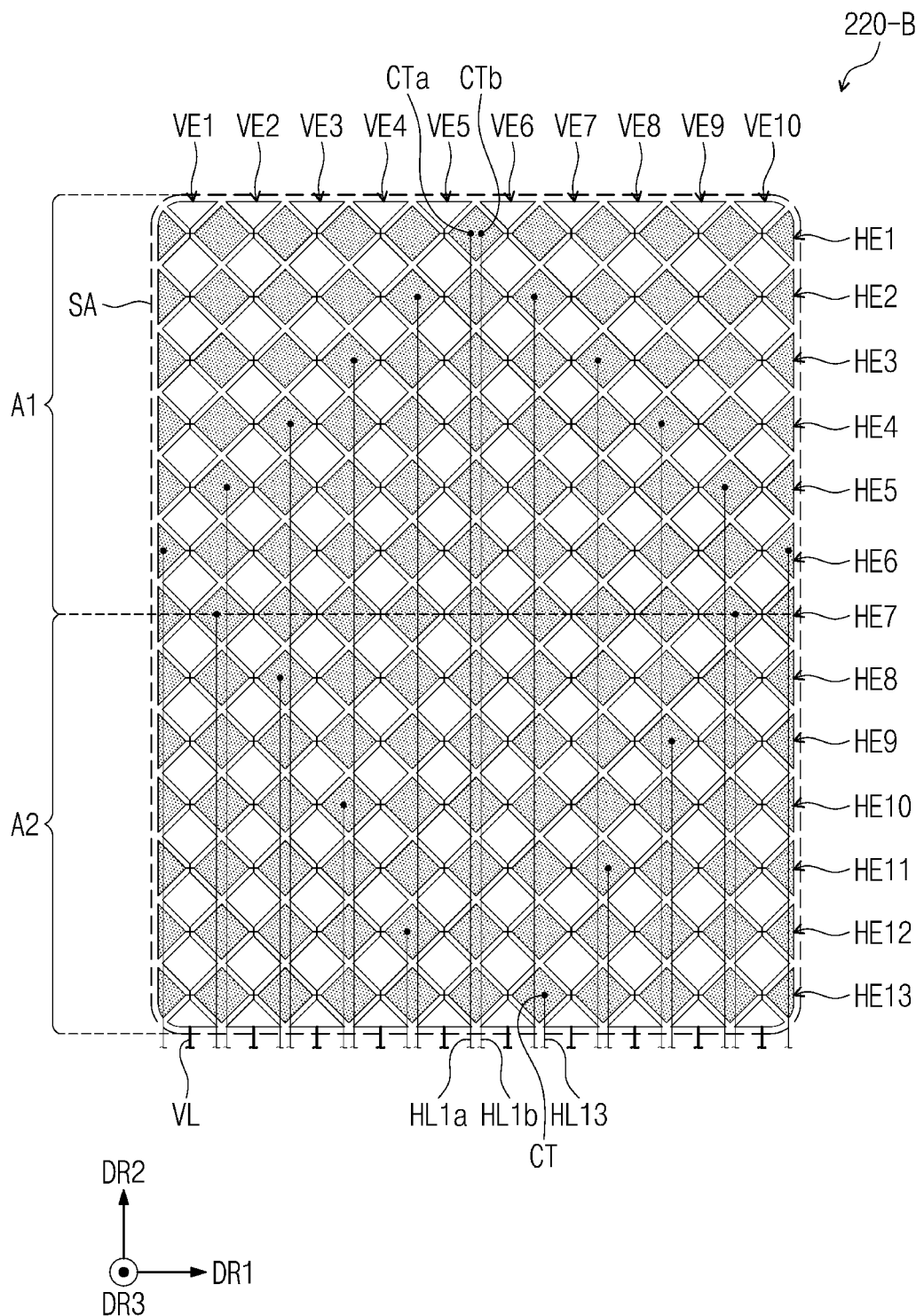
Figure 8C:
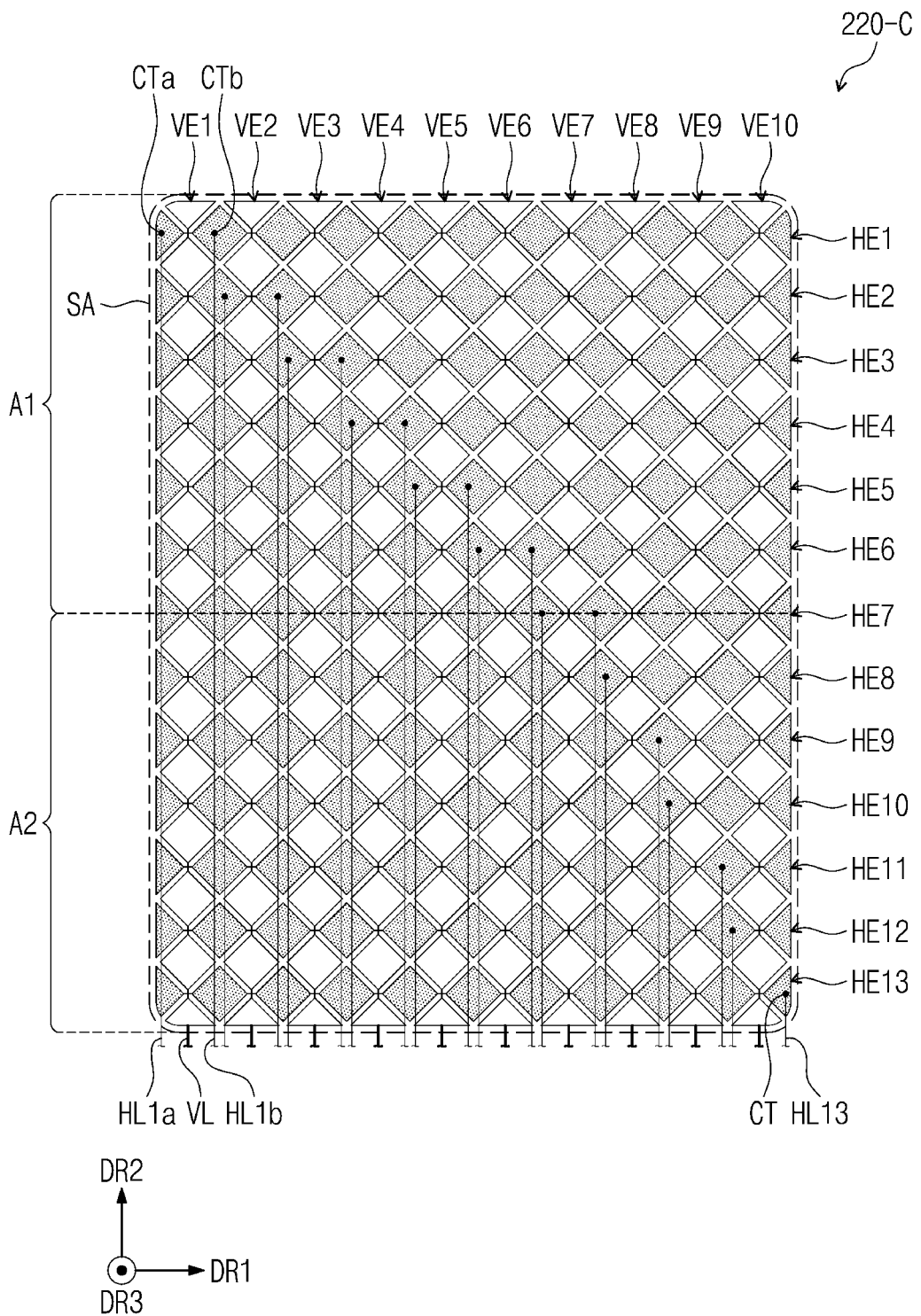

FIGS. 8A to 8C are plan views of sensor parts 220-A, 220-B, and 220-C according to embodiments of the present disclosure. For the convenience of explanation, FIGS. 8A to 8C show components disposed in a sensing area SA, and it is to be understood that there may be additional elements besides the elements shown. In FIGS. 8A to 8C, a first area A1 may include first to sixth row sensor electrodes HE1 to HE6, and a second area A2 may include eighth to thirteenth row sensor electrodes HE8 to HE13. A seventh row sensor electrode HE7 may be disposed in a boundary between the first area A1 and the second area A2 and may have a structure corresponding to that of the sensor electrodes disposed in the first area A1. Hereinafter, the present disclosure will be described with reference to FIGS. 8A to 8C. In FIGS. 8A to 8C, the same reference numerals denote the same elements in FIGS. 1A to 6B, and to the extent that an element has not been described in detail, it may be understood that the element is at least similar to corresponding elements that have been described elsewhere within the present disclosure.

Referring to FIG. 8A, in the sensor part 220-A, sensor lines are disposed closer to an outer side of the sensing area SA as a length of the sensor lines increases, and the sensor lines are disposed closer to a center of the sensing area SA as the length of the sensor lines decreases in each of the first area A1 and the second area A2. Accordingly, the length of the sensor lines disposed in each of the first area A1 and the second area A2 may decrease as a distance from the center of the sensing area SA decreases in a direction parallel to the first direction DR1 and may increase as the distance from the center of the sensing area SA increases in the direction parallel to the first direction DR1.

For example, the first row sensor electrode HE1 among first sensor electrodes HE1 to HE6 arranged in the first area A1 may be electrically connected to first sensor lines HL1a and HL1b via contact portions CTa and CTb. Since each of the first sensor lines HL1a and HL1b electrically connected to the first row sensor electrode HE1 has the longest length in the second direction DR2 and is disposed adjacent to the outer side of the sensing area SA, a distance in the first direction DR1 between the first sensor lines HL1a and HL1b may be the largest distance.

The sixth row sensor electrode HE6 among the first sensor electrodes HE1 to HE6 disposed in the first area A1 may be electrically connected to first sensor lines HL6a and HL6b via the contact portions CTa and CTb. Since each of the first sensor lines HL6a and HL6b electrically connected to the sixth row sensor electrode HE6 has the shortest length in the second direction DR2 and is disposed at the center of the sensing area SA among the first sensor lines disposed in the first area A1, a distance in the first direction DR1 between the first sensor lines HL6a and HL6b may be the smallest distance. In the present embodiment, the contact portions CTa and CTb of the first sensor lines HL6a and HL6b are shown as being disposed in one sensor pattern, however, the present disclosure should not necessarily be limited thereto or thereby.

For example, the sensor lines having the relatively long length may be disposed adjacent to the outer side of the sensing area SA, and the sensor lines having the relatively short length may be disposed adjacent to the center of the sensing area SA.

Accordingly, the sensor lines HL1a and HL1b electrically connected to the first row sensor electrode HE1 disposed farthest from the sensor driver in the first area A1 may be disposed closest to the outer side of the sensing area SA, and the sensor lines HL6a and HL6b electrically connected to the sixth row sensor electrode HE6 disposed closest to the sensor driver in the first area A1 may be disposed closest to the center of the sensing area SA. The distance in the first direction DR1 between the sensor lines HL1a and HL1b electrically connected to the first row sensor electrode HE1 may be the largest distance, and the distance in the first direction DR1 between the sensor lines HL6a and HL6b electrically connected to the sixth row sensor electrode HE6 may be the smallest distance. According to the present embodiment, the sensor lines HL6a and HL6b are shown as being electrically connected to the sixth row sensor electrode HE6 via the contact portions CTa and CTb provided in one first sensor pattern SP1, however, they should not necessarily be limited thereto or thereby.

Each of the first sensor electrodes HE8 to HE13 disposed in the second area A2 may be electrically connected to one sensor line, and the sensor line may be disposed at the outer side of the sensing area SA in the first direction DR1 as the length of the sensor line increases. For example, the sensor lines having the relatively long length may be disposed adjacent to the other side of the sensing area SA, and the sensor lines having the relatively short length may be disposed adjacent to the center of the sensing area SA. For the convenience of explanation, FIG. 8A shows only the reference number of the first sensor line HL13, which is electrically connected to the thirteenth row first electrode H13, among the first sensor lines electrically connected to the first sensor electrodes disposed in the second area A2.

Accordingly, the sensor line electrically connected to the eighth row sensor electrode HE8 disposed farthest from the sensor driver in the second area A2 may be disposed adjacent to the outer side of the sensing area SA with comparing to the first sensor lines electrically connected to the first sensor electrodes disposed in the second area A2, and the sensor line HL13 electrically connected to the thirteenth row sensor electrode HE13 disposed closest to the sensor driver may be disposed adjacent to the center of the sensing area SA.

The seventh row sensor electrode HE7 disposed at the boundary between the first area A1 and the second area A2 may have a structure corresponding to the sensor electrodes disposed in the first area A1. Accordingly, the seventh row sensor electrode HE7 may be electrically connected to two sensor lines via two contact portions. The sensor lines electrically connected to the seventh row sensor electrode HE7 may be disposed closer to the outer side of the sensing area SA than the sensor lines electrically connected to the second area A2 are. The sensor lines of the second area A2, which have a relatively short length compared with the sensor lines electrically connected to the seventh row sensor electrode HE7, may be disposed closer to the center of the sensing area SA than the sensor lines electrically connected to the seventh row sensor electrode HE7 are.

When comparing the first row sensor electrode HE1 with the thirteenth row sensor electrode HE13, the sensor lines HL1a and HL1b electrically connected to the first row sensor electrode HE1 may have a relatively long length, and the sensor line HL13 electrically connected to the thirteenth row sensor electrode HE13 may have a relatively short length. Accordingly, an electrical interference of the sensor lines HL1a and HL1b electrically connected to the first row sensor electrode HE1 to the sensing area SA may be greater than that of the sensor line HL13 electrically connected to the thirteenth row sensor electrode HE13 to the sensing area SA. According to the present disclosure, as the sensor lines HL1a and HL1b electrically connected to the first row sensor electrode HE1 are disposed adjacent to the outer side of the sensing area SA and the sensor line HL13 electrically connected to the thirteenth row sensor electrode HE13 is disposed adjacent to the center of the sensing area SA, an area where a relatively large parasitic capacitance occurs may be set in a peripheral portion of the sensing area SA rather than the center of the sensing area SA. In addition, as the number of the sensor lines HL1a and HL1b electrically connected to the first row sensor electrode HE1 is set to be greater than the number of the sensor lines electrically connected to the thirteenth row sensor electrode HE13, the parasitic capacitance occurring in one sensor line may be reduced. Accordingly, the noise caused by the overlapping between the sensor lines and the sensing area SA may be reduced, and a deterioration of sensitivity in the sensing area SA may be prevented.

Referring to FIG. 8B, sensor lines disposed in the first area A1 may be arranged in a different way from sensor lines disposed in the second area A2 in the sensor part 220-B. In the present embodiment, the sensor lines disposed in the first area A1 are disposed closer to a center of the sensing area SA as a length of the sensor lines increases and may be disposed closer to an outer side of the sensing area SA as the length of the sensor lines decreases. Accordingly, the length of the sensor lines disposed in the first area A1 may increase as a distance from the center of the sensing area SA decreases in the direction parallel to the first direction DR1 and may decrease as the distance from the center of the sensing area SA increases in the direction parallel to the first direction DR1.

Different from the above descriptions, the sensor lines disposed in the second area A2 are disposed closer to the outer side of the sensing area SA as the length of the sensor lines increases and may be disposed closer to the center of the sensing area SA as the length of the sensor lines decreases. Accordingly, the length of the sensor lines disposed in the second area A2 may decrease as the distance from the center of the sensing area SA decreases in the direction parallel to the first direction DR1 and may increase as the distance from the center of the sensing area SA increases.

Referring to FIG. 8C, sensor lines may be sequentially arranged along the first direction DR1 in the sensor part 220-C. In the present embodiment, the sensor lines disposed in the first area A1 may be disposed at a left side in the sensing area SA, and the sensor lines disposed in the second area A2 may be disposed at a right side in the sensing area SA. The sensor lines HL1a and HL1b electrically connected to the first row sensor electrode HE1 disposed farthest from a sensor driver may be disposed at a leftmost side in the sensing area SA, and the sensor line HL13 electrically connected to the thirteenth row sensor electrode HE13 disposed closest to the sensor driver may be disposed at the rightmost side of the sensing area SA.

According to the present disclosure, the sensor lines HL1a and HL1b electrically connected to the one sensor electrode may be disposed adjacent to each other in the first direction DR1. Accordingly, the connection of the sensor lines HL1a and HL1b may be easily implemented in the electronic panel.

Figure 9A:
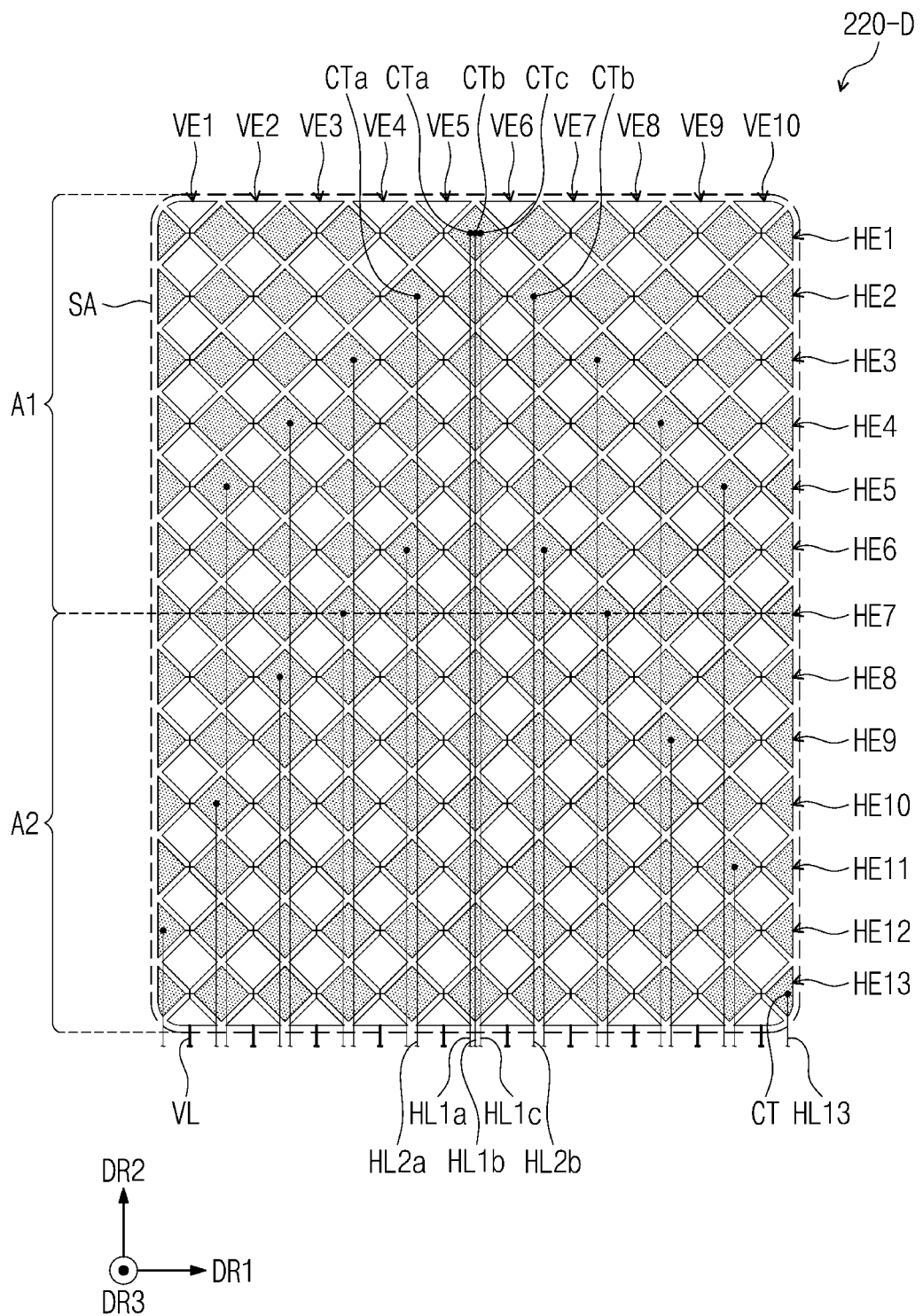
FIGS. 9A and 9B are plan views of sensor parts according to embodiments of the present disclosure.
Figure 9B:
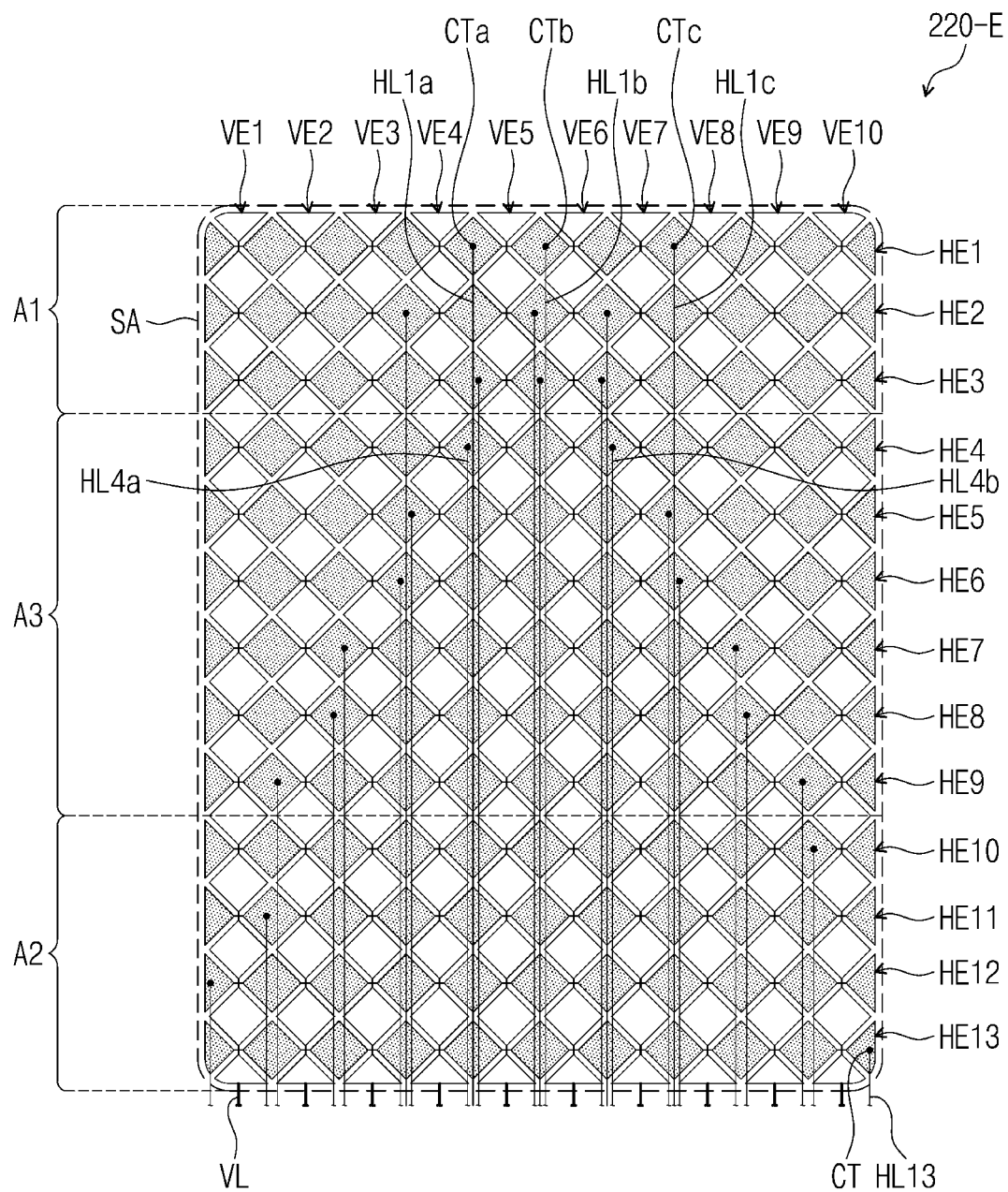

FIGS. 9A and 9B are plan views of sensor parts 220-D and 220-E according to embodiments of the present disclosure. For the convenience of explanation, FIGS. 9A and 9B show components disposed in a sensing area SA, and additional components may be present. Hereinafter, the present disclosure will be described with reference to FIGS. 9A and 9B. In FIGS. 9A and 9B, the same reference numerals denote the same elements in FIGS. 1A to 7B, and thus, to the extent that an element has not been described in detail herein, it may be understood that the element is at least similar to corresponding elements described elsewhere within the present disclosure.

Referring to FIG. 9A, different from other sensor electrodes disposed in a first area A1, three contact portions CTa, CTb, and CTc may be provided to a first row sensor electrode HE1 in the sensor part 220-D. For example, among the sensor electrodes disposed in the first area A1, the first row sensor electrode HE1 may be electrically connected to three first sensor lines HL1a, HL1b, and HL1c, and a second row sensor electrode HE2 may be electrically connected to two first sensor lines HL2a and HL2b. Third to seventh row sensor electrodes HE3 to HE7 may also be designed with a structure corresponding to that of the second row sensor electrode HE2. A thirteenth row sensor electrode HE13 disposed in a second area A2 may be electrically connected to a single sensor line HL13 via a single contact portion CT. According to the present disclosure, as a larger number of the sensor lines HL1a, HL1b, and HL1c is provided to the first row sensor electrode HE1 disposed farthest from a sensor driver, a load applied to each of the sensor lines HL1a, HL1b, and HL1c may be reduced, and a parasitic capacitance generated by each of the sensor lines HL1a, HL1b, and HL1c may be reduced. Accordingly, the deterioration in sensitivity of the sensing area SA may be prevented.

The sensor part 220-D may have the structure in which the three contact portions CTa, CTb, and CTc are provided to the one sensor pattern SP1, however, this is merely an example. According to an embodiment, the three contact portions CTa, CTb, and CTc may be provided to different sensor patterns from each other in the first row sensor electrode HE1 and should not necessarily be particularly limited thereto.

Referring to FIG. 9B, the sensor part 220-E may include first, second, and third areas A1, A2, and A3 arranged in the second direction DR2. The sensor part 220-E may include first sensor electrodes electrically connected to sensor lines via different numbers of contact portions according to the first to third areas A1, A2, and A3.

For example, the first area A1 may be an area farthest from a sensor driver, and first, second, and third row sensor electrodes HE1, HE2, and HE3 may be disposed in the first area A1. Each of the first, second, and third row sensor electrodes HE1, HE2, and HE3 may be electrically connected to three sensor lines via three contact portions. In the present embodiment, reference numerals of three contact portions CTa, CTb, and CTc disposed in the first row sensor electrode HE1 and three first sensor lines HL1a, HL1b, and HL1c electrically connected to the three contact portions CTa, CTb, and CTc are illustrated as a representative example.

The second area A2 may be an area closest to the sensor driver, and tenth, eleventh, twelfth, and thirteenth row sensor electrodes HE10, HE11, HE12, and HE13 may be disposed in the second area A2. Each of the tenth, eleventh, twelfth, and thirteenth row sensor electrodes HE10, HE11, HE12, and HE13 may be electrically connected to one first sensor line via one contact portion. In the present embodiment, a reference numeral of the first sensor line HL13 electrically connected to the thirteenth row sensor electrode HE13 is illustrated as a representative example.

The third area A3 may be disposed between the first area A1 and the second area A2, and fourth, fifth, sixth, seventh, eighth, and ninth row sensor electrodes HE4, HE5, HE6, HE7, HE8, and HE9 may be disposed in the third area A3. Each of the fourth, fifth, sixth, seventh, eighth, and ninth row sensor electrodes HE4, HE5, HE6, HE7, HE8, and HE9 may be electrically connected to two first sensor lines via two contact portions. In the present embodiment, reference numerals of two first sensor lines HL4a and HL4b electrically connected to the fourth row sensor electrode HE4 are illustrated as a representative example.

According to the present disclosure, the sensor electrodes HE1, HE2, and HE3 disposed in the first area A1, which is spaced apart from the sensor driver with a large separation distance, may be provided with a greater number of contact portions to be electrically connected to the sensor driver via a greater number of sensor lines. Accordingly, a load applied to the sensor lines with the long length may be reduced, a parasitic capacitance between the sensor lines and second sensor electrodes VE1 to VE10 may be reduced, and thus, the deterioration in sensitivity of the sensor part 220-E may be prevented.

Figure 10:
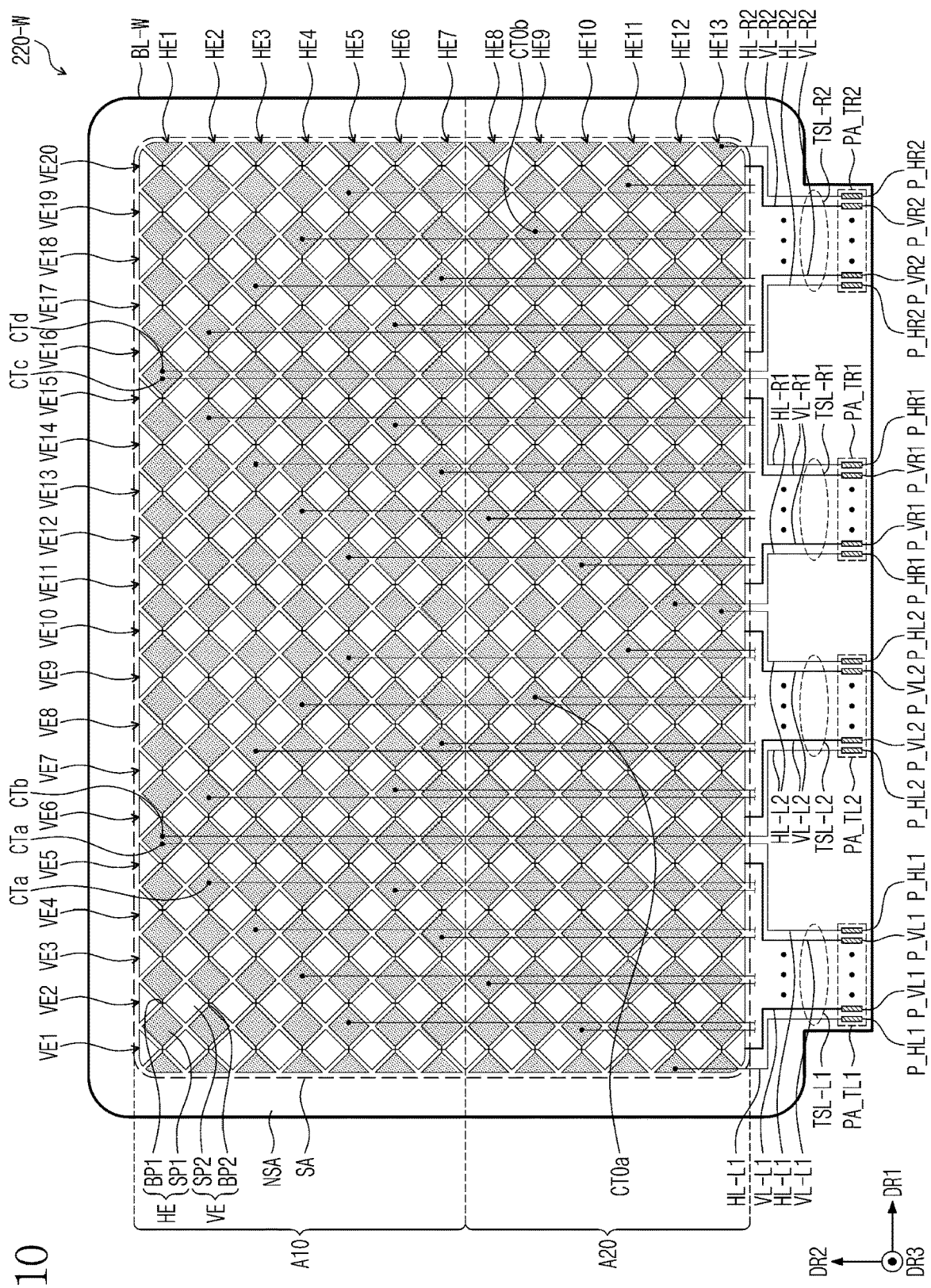
FIG. 10 is a plan view of a sensor part according to an embodiment of the present disclosure.

FIG. 10 is a plan view of a sensor part 220-W according to an embodiment of the present disclosure. FIG. 10 shows a structure in which the sensor part 220-W is disposed on a base layer BL-W, which corresponds to the sensor part shown in FIG. 2B. Hereinafter, the present disclosure will be described in detail with reference to FIG. 10. In FIG. 10, the same reference numerals denote the same elements in FIGS. 1A to 9B, and thus, to the extent that an element has not been described in detail, it may be understood that the element is at least similar to corresponding elements that have been described elsewhere within the present disclosure.

Referring to FIG. 10, the base layer BL-W may have a shape defined by long sides extending in the first direction DR1 and short sides extending in the second direction DR2. Accordingly, each of first sensor electrodes HE1 to HE13 may have a length respectively longer than that of the first sensor electrodes HE1 to HE13 shown in FIG. 2B in the first direction DR1. In addition, the number of second sensor electrodes VE1 to VE20 may be larger than the number of the second sensor electrodes VE1 to VE10 shown in FIG. 2B. In the present embodiment, the number of the second sensor electrodes VE1 to VE20 included in the sensor part 220-W is twenty.

Sensor pad areas PA_TL1, PA_TL2, PA_TR1, and PA_TR2 in which sensor pads P_HL1 and P_VL1, P_HL2 and P_VL2, P_HR1 and P_VR1, and P_HR2 and P_VR2 are respectively disposed may be defined as four areas arranged in the first direction DR1. Second sensor pads P_VL1 electrically connected to second sensor lines VL-L1 electrically connected to first to fifth column sensor electrodes VE1 to VE5 may be disposed in a first left-side pad area PA_TL1 among the sensor pad areas PA_TL1, PA_TL2, PA_TR1, and PA_TR2. Second sensor pads P_VL2 electrically connected to second sensor lines VL-L2 electrically connected to sixth to tenth column sensor electrodes VE6 to VE10 may be disposed in a second pad area PA_TL2. Second sensor pads P_VR1 electrically connected to second sensor lines VL-R1 electrically connected to eleventh to fifteenth column sensor electrodes VE11 to VE15 may be disposed in a third pad area PA_TR1. Second sensor pads P_VR2 electrically connected to second sensor lines VL-R2 electrically connected to sixteenth to twentieth column sensor electrodes VE16 to VE20 may be disposed in the fourth pad area PA_T4.

First to seventh row sensor electrodes HE1 to HE7 may be disposed in a first area A10 spaced relatively far apart from the sensor pad areas PA_TL1, PA_TL2, PA_TR1, and PA_TR2, and eighth to thirteenth row sensor electrodes HE8 to HE13 may be disposed in a second area A20 disposed closer to the sensor pad areas PA_TL1, PA_TL2, PA_TR1, and PA_TR2. Each of the sensor electrodes HE1 to HE7 disposed in the first area A10 may be electrically connected to four first sensor lines HL-L1, HL-L2, HL-R1, and HL-R2 via four contact portions CTa, CTb, CTc, and CTd. Each of the sensor electrodes HE8 to HE13 disposed in the second area A20 may be electrically connected to two first sensor lines among twenty-four first sensor lines HL-L1, HL-L2, HL-R1, and HL-R2 via two contact portions CT0a and CT0b. Each of the sensor electrodes HE1 to HE7 disposed in the first area A10 may be electrically connected to the pads P_HL1, P_HL2, P_HR1, and P_HR2 respectively disposed in the four sensor pad areas PA_TL1, PA_TL2, PA_TR1, and PA_TR2. Each of the sensor electrodes HE8 to HE13 disposed in the second area A20 may be electrically connected to the pads disposed in two areas among the four sensor pad areas PA_TL1, PA_TL2, PA_TR1, and PA_TR2. This is merely an example, and the number or arrangement of the sensor lines may be changed in various ways depending on the number or arrangement of the sensor electrodes HE and VE and should not necessarily be particularly limited thereto as long as the number of the first sensor lines electrically connected to the first row sensor electrode HE1 is larger than the number of the first sensor lines electrically connected to the thirteenth row sensor electrode HE13.

Although the embodiments of the present disclosure have been described, it is understood that the present disclosure should not necessarily be limited to these embodiments but various changes and modifications can be made by one ordinary skilled in the art within the spirit and scope of the present disclosure. Therefore, the disclosed subject matter should not necessarily be limited to any single embodiment described herein.

What is claimed:

1. An input sensor, comprising:
    a plurality of first sensor electrodes extending in a first direction within an active area of the input sensor, each of the first sensor electrodes comprising a plurality of first sensor patterns arranged in the first direction and a plurality of first connection patterns each disposed between the first sensor patterns and electrically connecting adjacent pairs of the first sensor patterns adjacent;
    a plurality of second sensor electrodes arranged along the first direction within the active area and extending in a second direction crossing the first direction, each of the second electrodes comprising a plurality of second sensor patterns arranged in the second direction and a plurality of second connection patterns each disposed between adjacent pairs of the second sensor patterns to electrically connect the adjacent pairs of the second sensor patterns to each other;
    a sensor driver disposed in a peripheral area of the input sensor, adjacent to the active area and spaced apart from the active area in the second direction;
    a plurality of first sensor lines electrically connecting the first sensor electrodes to the sensor driver and overlapping the active area; and
    a plurality of second sensor lines electrically connecting the second sensor electrodes to the sensor driver,
    wherein the first sensor electrodes comprise first to n-th row sensor electrodes, where n is a positive integer,
    wherein a number of first lines electrically connected to the first row sensor electrode is larger than a number of first lines electrically connected to the n-th row sensor electrode,
    wherein at least some of the first sensor lines overlap multiple second sensor patterns within the active area; and
    wherein a width, in the first direction, of each of the first sensor lines overlapping multiple second sensor patterns within the active area, is smaller than a width, in the first direction, of each of the second sensor lines in the active area.

2. The input sensor of claim 1, wherein the first connection patterns are disposed on a layer that is different from a layer of the second connection patterns.

3. The input sensor of claim 2, wherein the first lines are disposed on a layer that is different from a layer of the first sensor patterns within the active area.

4. The input sensor of claim 3, wherein the first sensor lines are disposed on a same layer as the first connection patterns and/or the second connection patterns.

5. The input sensor of claim 4, wherein the first sensor lines are spaced apart from the first connection patterns and the second connection patterns, in a plan view.

6. The input sensor of claim 2, wherein the first sensor lines electrically connected to the first row sensor electrode are electrically connected to one first sensor pattern.

7. The input sensor of claim 2, wherein the first lines electrically connected to the first row sensor electrode are respectively electrically connected to different first sensor patterns.

8. The input sensor of claim 1, wherein the first sensor lines electrically connected to the first row sensor electrode overlap at least one of the second sensor lines in the peripheral area.

9. The input sensor of claim 1, wherein each of the first sensor lines consists of a singular integral structure.

10. The input sensor of claim 1, wherein each of the first lines comprises a vertical portion extending in the second direction and a horizontal portion extending in the first direction and electrically connected to the vertical portion, wherein the vertical portion overlaps at least a portion of the first sensor electrodes, and wherein the horizontal portion is spaced apart from the first sensor electrodes, in a plan view.

11. The input sensor of claim 10, wherein a width in the first direction of the vertical portion is smaller than a width in the first direction of each of the second sensor lines.

12. The input sensor of claim 11, wherein the width in the first direction of the vertical portion is smaller than a width in the second direction of the horizontal portion.

13. The input sensor of claim 10, wherein the vertical portion and the horizontal portion are disposed on different layers from each other.

14. An electronic device, comprising:
    a base layer comprising an active area and a peripheral area adjacent to the active area;
    a plurality of first sensor electrodes comprising a plurality of first sensor patterns disposed within the active area and arranged in a first direction and a plurality of first connection patterns each disposed between adjacent pairs of the first sensor patterns and electrically connecting the adjacent pairs of the first sensor patterns to each other;
    a plurality of second sensor electrodes comprising a plurality of second sensor patterns disposed within the active area and arranged in a second direction crossing the first direction and a plurality of second connection patterns each disposed between adjacent pairs of the second sensor patterns and electrically connecting the adjacent pairs of the second sensor patterns, the second connection patterns being electrically insulated from the first connection patterns;
    a circuit board electrically connected to the base layer and comprising a sensor driver spaced apart from the first sensor electrodes in the second direction;
    a plurality of first sensor lines electrically connecting the sensor driver and the first sensor electrodes; and
    a plurality of second sensor lines electrically connecting the sensor driver and the second sensor electrodes,
    wherein each of the first sensor lines comprises a contact portion that is in contact with a corresponding first sensor electrode among the first sensor electrodes, and a number of contact portions provided in a first row sensor electrode disposes farthest from the sensor driver among the first sensor electrodes is larger than a number of contact portions provided in an n-th row of the first sensor electrodes disposed closest to the sensor driver among the first sensor electrodes, where n is a positive integer, wherein at least some of the first sensor lines overlap multiple second sensor patterns within the active area; and wherein a width of each of the first sensor lines in the active area, overlapping multiple second sensor patterns within the active area, is smaller than a width of each of the second sensor lines in the active area.

15. The electronic device of claim 14, wherein the number of the contact portions provided in the first row sensor electrode is equal to or greater than two, and the number of the contact portions provided in the n-th row sensor electrode is equal to or greater than one.

16. The electronic device of claim 15, wherein the contact portions provided in the first row sensor electrode are provided to one first sensor part.

17. The electronic device of claim 15, wherein the contact portions provided in the first row sensor electrode are provided to different first sensor patterns from each other.

18. The electronic device of claim 15, wherein the contact portions electrically connected to each of the first to n-th row sensor electrodes are sequentially arranged in the first direction.

19. The electronic device of claim 15, wherein the contact portion provided in the n-th row sensor electrode is disposed between the contact portions provided in the first row sensor electrode, when viewed in the first direction.

20. The electronic device of claim 15, wherein the contact portion that is in contact with the first sensor lines electrically connected to the first row sensor electrode is provided on the base layer.

21. The electronic device of claim 15, wherein the contact portion that is in contact with the first sensor lines electrically connected to the first row sensor electrode is provided on the circuit board.

22. The electronic device of claim 14, further comprising:
an organic light emitting element disposed between the base layer and the first sensor electrodes and disposed within the active area;
a power pattern electrically connected to the organic light emitting element and disposed within the peripheral area; and
an insulating layer disposed between the power pattern and the first sensor lines,
wherein at least a portion of the first sensor lines and the second sensor lines overlaps the power pattern, in a plan view.

23. The electronic device of claim 22, wherein the insulating layer is provided in plural, and each of the first sensor lines comprises a plurality of portions disposed on different layers from each other, above the power pattern and electrically connected to each other via at least one of the insulating layers.

* * * * *